United States Patent
Elshaw et al.

(10) Patent No.: US 8,335,699 B2
(45) Date of Patent: Dec. 18, 2012

(54) METHOD OF FINANCING UNFUNDED LIABILITIES

(75) Inventors: Patrick J. Elshaw, Traverse City, MI (US); Timothy Heger, Traverse City, MI (US)

(73) Assignee: Retirement Benefit Solutions, LLC, Traverse City, MI (US)

( * ) Notice: Subject to any disclaimer, the term of this patent is extended or adjusted under 35 U.S.C. 154(b) by 264 days.

(21) Appl. No.: 12/780,542

(22) Filed: May 14, 2010

(65) Prior Publication Data
US 2010/0293010 A1  Nov. 18, 2010

Related U.S. Application Data

(60) Provisional application No. 61/178,386, filed on May 14, 2009.

(51) Int. Cl.
*G06Q 40/00* (2012.01)
(52) U.S. Cl. .............................. 705/4; 705/35
(58) Field of Classification Search .............. 705/35–45, 705/4, 1.1
See application file for complete search history.

(56) References Cited

U.S. PATENT DOCUMENTS

| | | | |
|---|---|---|---|
| 5,802,500 A | 9/1998 | Ryan et al. | |
| 5,956,691 A * | 9/1999 | Powers | 705/4 |
| 6,456,979 B1 * | 9/2002 | Flagg | 705/4 |
| 7,634,420 B2 * | 12/2009 | Kendall et al. | 705/4 |
| 7,778,912 B2 * | 8/2010 | Kendall et al. | 705/37 |
| 8,224,672 B1 * | 7/2012 | Griffith | 705/4 |
| 8,229,839 B2 * | 7/2012 | Kendall et al. | 705/37 |
| 2002/0091613 A1 * | 7/2002 | Kendall et al. | 705/37 |
| 2003/0191672 A1 * | 10/2003 | Kendall et al. | 705/4 |
| 2005/0131742 A1 * | 6/2005 | Hoffman et al. | 705/4 |
| 2006/0271459 A1 * | 11/2006 | Lange | 705/35 |
| 2008/0133279 A1 | 6/2008 | Pollock et al. | |
| 2010/0145735 A1 * | 6/2010 | Kendall et al. | 705/4 |
| 2010/0293010 A1 * | 11/2010 | Elshaw et al. | 705/4 |

OTHER PUBLICATIONS

Kurylo, Steve., "Choose the most appropriate insurance policy and company", Estate Planning. New York: Oct. 1996. vol. 23, iss. 8, p. 366, 7 pgs.*
Bragg, John, M., "The life industry needs a product-rating system", National Underwriter. (Life, health/financial services ed.) Erlanger: Apr. 17, 1995., vol. 99, iss. 16, p. 11, 2 pgs.*
Blease, Roger. L, "Is it time for a product rating system? How could it be done", Best's Review (Life/health insurance edition). Oldwick: Dec. 1995, vol. 96, iss. 8; p. 27, 5 pgs.*

* cited by examiner

*Primary Examiner* — Ella Colbert
*Assistant Examiner* — Mohammad Z Shaikh
(74) *Attorney, Agent, or Firm* — Gifford, Krass, Sprinkle, Anderson & Citkowski, P.C.

(57) ABSTRACT

A method is disclosed of financing the liabilities of sovereign governmental entities, their political subunits, and like entities (e.g., school boards, etc.), and private business entities through the use of insurance products. In one embodiment, the method may include: receiving a population data set, generating a plurality of mortality data sets, generating a financial target data set, transmitting the financial target data set to a plurality of life insurance vendors, receiving from each of at least two life insurance vendors a rate table, generating a proportional rating for each insurance vendor, generating a final rate table having a per member life insurance premium rate for each mortality data set.

10 Claims, 5 Drawing Sheets

METHOD OF FINANCING UNFUNDED LIABILITIES

CROSS-REFERENCE TO RELATED APPLICATIONS

This application claims priority from U.S. Provisional Application No. 61/178,386, filed May 14, 2009, the disclosure of which is incorporated by reference herein in its entirety.

FIELD OF THE INVENTION

A method is disclosed of financing the liabilities of sovereign governmental entities, their political subunits, and like entities (e.g., school boards, etc.), and private business entities through the use of insurance products.

BACKGROUND OF THE INVENTION

Tough economic conditions affect many, if not all, of the states and their political subunits. Income constraints and expense pressures make it difficult to balance budgets on an annual basis. Governmental units must also deal with issues concerning unfunded liabilities following the implementation of the Governmental Accounting Standards Board (GASB) Statement 45 concerning Other Post Employee Benefits (OPEB). Under Statement 45, unfunded liabilities must be accounted for in financial statements. This burden of having to account for unfunded liabilities places more pressure on already strained budgeting systems.

Two issues are worth particular mention when discussing unfunded liabilities. One is the amount of the unfunded liability. By way of example, the 2006 Michigan Comprehensive Annual Financial Report (CAFR) for public school employees estimated a FY2005 pension plan deficit of just under 10 billion dollars. This was a deficit increase of $2.45 billion dollars over the prior year. Other estimates showed this gap widening. If other state agencies are also accounted for, the deficit grows to over $12 billion dollars, not including the potential accounting problems raised by Statement 45.

The other issue worth particular mention is the type and availability of the contributions that are made to pay for liabilities. This issue may be demonstrated by looking at the state of the Michigan Public School Employee Retirement System (MPSERS). The Annual Required Contribution (ARC) for the MPSERS for 2006 was over 1.1 billion dollars. The actual contribution was slightly under $1 billion dollars. This under funding of payments compounded the overall negative economic outlook, and becomes more serious still when OPEB and Statement 45 are considered.

The financial ramifications of unfunded liabilities on states and their subunits is significant and long term. The credit rating agency Standard and Poor (S&P) may also be closely watching this issue, especially as it relates to OPEB and Statement 45. Pensions are typically funded at the 80th percentile. However, OPEB is funded at the 25th percentile. Therefore, if the new accounting rules in Statement 45 are ignored, the result could be that a state or subunit would see a lowering of its credit rating. A lowered credit rating could result in higher borrowing costs and unfavorable changes in how interest accumulation is calculated under the ARC.

Factors that governmental units need to consider to address the issues mentioned above include adjustments to benefits, addressing funding issues, and the creation of unique solutions to enhance cash flow. Each of these factors may be addressed on several levels, such as reducing post employment benefits (OPEB), offering new employees/new retirees adjusted benefits, and placing a cap on employer-provided benefits. The governmental units may also utilize early buy-out programs to change the cash flow cycle. Finally, other methods may be utilized to create additional solutions to the problem of unfunded liabilities.

SUMMARY OF THE INVENTION

In the disclosed embodiment of the method, insurance products may be used to transfer the funding risks of unfunded liabilities to another organization (i.e., an insurance vendor). The method provides an efficient solution that may increase the return on investment (ROI) with minimal risk. As a result, a governmental (or private) unit may be free to support its liabilities without new investment or spending. Cash flow may also be freed up so that it may be utilized in other areas of a governmental unit's budget. For example, where a governmental unit anticipates making total yearly payments of X to fund a liability (e.g., a pension), the disclosed method may permit the governmental unit to achieve that same funding level through the coordinated purchase of life insurance having returns equaling the funding target but yearly premium payments that are less than X.

In one embodiment, the method may be described as including the steps of:

A. Accumulate census/populations data, including demographic data for each member of the population;

B. Complete preliminary analysis by, for example, determining mortality data and estimated insurance rates and then using that information and financial projection data to determine a projected funding need;

D. Complete extensive analysis including life insurance rates information, as modified by a proportional rating for each insurance vendor;

E. Implement solution;

F. Monitor solution as needed.

However, as will be described below, these various general steps may be further distilled and recharacterized to yield the claimed method.

In operation, the disclosed method may provide an option for governmental units to control their liability as well as increase cash flows. It will be an efficient solution to address a growing problem in pension and OPEB promised benefits.

BRIEF DESCRIPTION OF THE DRAWINGS

Reference will now be made to the attached drawings, wherein like reference numbers refer to like parts throughout, and wherein.

DETAILED DESCRIPTION OF THE PREFERRED EMBODIMENTS

Figure 1:
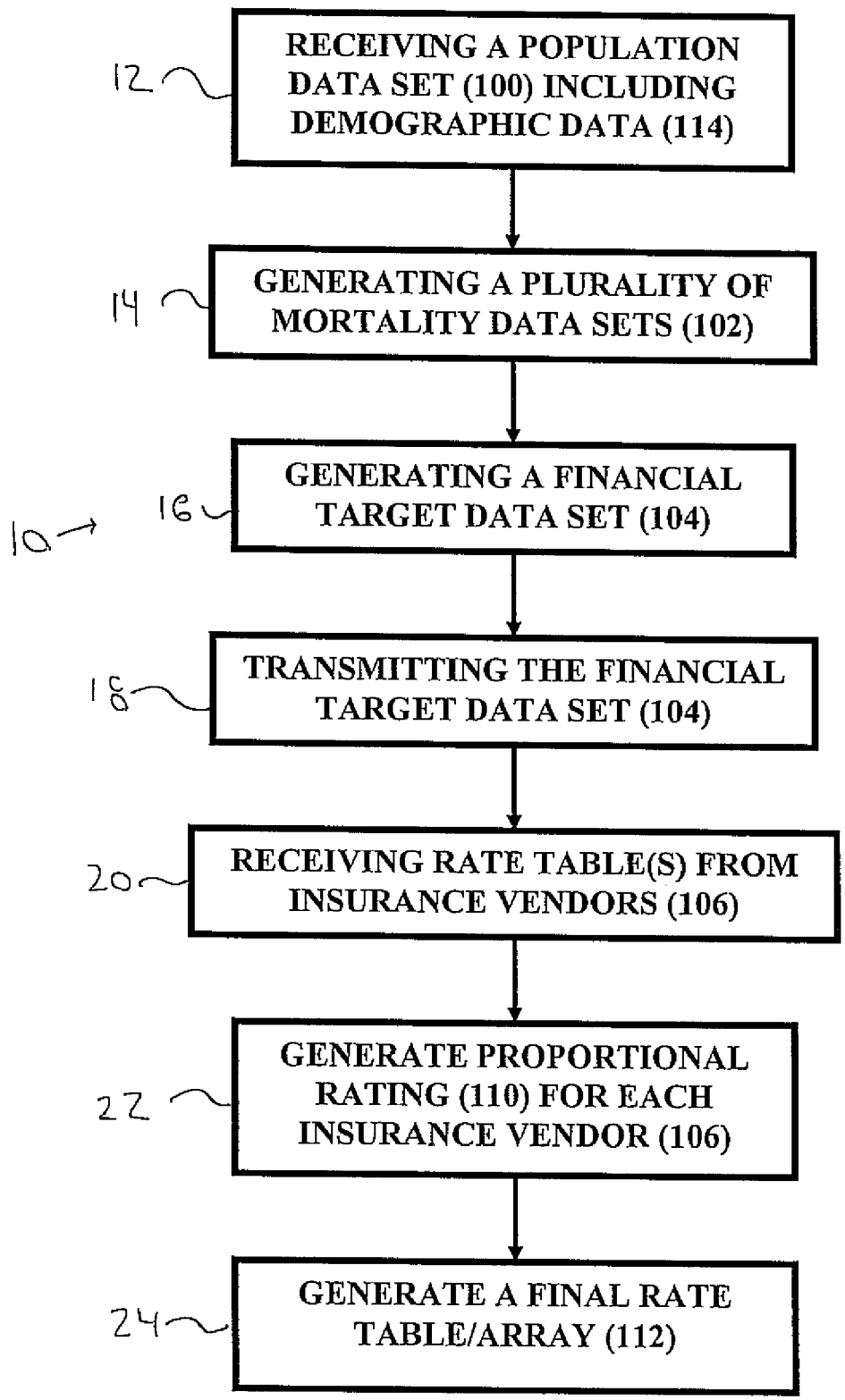
FIG. 1 is a diagrammatic view of an embodiment of the method.

Referring now to FIG. 1-5, one embodiment of a method 10 for financing the unfunded liability of a governmental unit (quasi-government or private entity) may include: receiving 12 a population data set 100, generating 14 a plurality of mortality data sets 102, generating 16 a financial target data set 104, transmitting 18 the financial target data 104 set to a plurality of life insurance vendors 106, receiving 20 from each of at least two life insurance vendors 106 a rate table 108, generating 22 a proportional rating 110 for each insurance vendor 106, generating 24 a final rate table 112 having a per member life insurance premium rate for each mortality data set 102. The method 10 may be carried out automatically through the use of a networked computer server (not shown) having a processor module, a computer readable electronic storage module, an input device and a display, or a similar apparatus. The networked computer server may also be specially programmed to include particular calculations, discussed infra, for mortality, death benefit modeling, insurance premium modeling, population modeling, and financial modeling.

Figure 2:
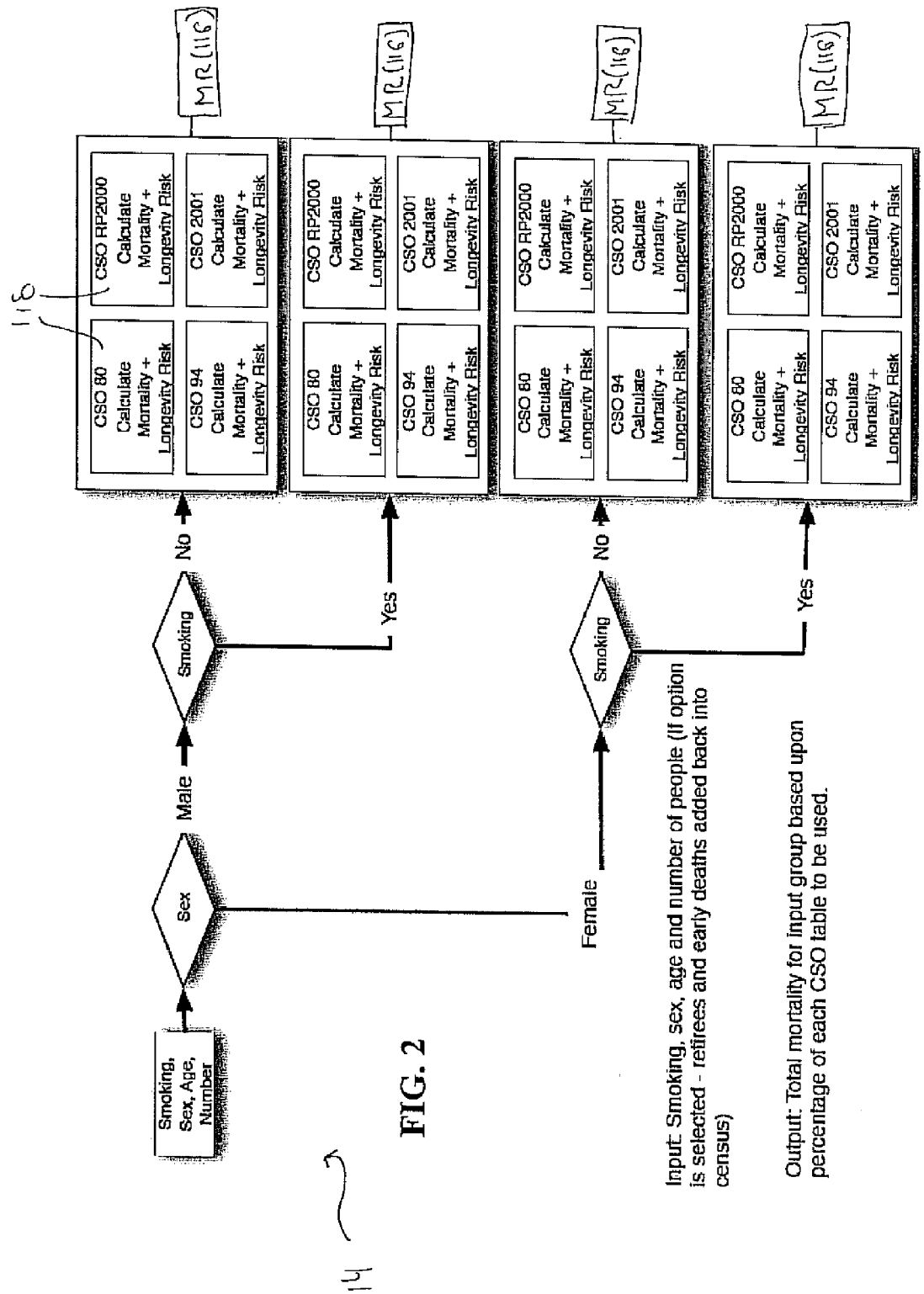
FIG. 2 is a diagrammatic view showing the generation of a mortality data set.

Referring now to FIGS. 1 and 2, as part of the disclosed method 10 a population data set 100 is received 10 that may include demographic data 114 for each member of a predetermined population. The predetermined population data set may include, related to and/or identify employees or individuals associated with the unfunded liability to be financed. For example, where the unfunded liability is a teacher's pension fund, the defined or predetermined population of the population data set may include the number of teachers/retirees that pay into or collect from the fund. Likewise, where the unfunded liability is a state pension fund, the population data set may include all state employees that pay into that fund. However, it will be appreciated that the population data set include individuals who are not associated with the unfunded liability (e.g., spouses or dependents of employees), or a combination of individuals with some being associated with the unfunded liability and others who are not associated with the unfunded liability.

The data set 100 may be transmitted into or otherwise input into the computer readable electronic storage module of the computer server. The data set 100 may also be transmitted to the server directly from by the entity responsible for an unfunded liability.

Still referring to FIGS. 1 and 2, the population data set 100 may also include demographic data 114 about each member of the predetermined population (e.g., teachers, state workers, etc.). This demographic data 114 many include gender data and smoking status data (i.e., (1) male smokers; (2) male nonsmokers (3) female smokers; and (4) female nonsmokers). However, other data may also be used including age, population group member health status; employment compensation status (salary/nonsalary); employment responsibility level status (title/management); type or area of employment (department); physical location (geography).

Still referring to FIGS. 1 and 2, another step of the disclosed method 10 may include generating 12 a plurality of mortality data sets 102. Each mortality data set 102 may be defined to include a group of members of the population data set 100 that have a common set of demographic data 114 (e.g., same age, gender and smoking status). The mortality data sets 102 may also include an estimated mortality rate 116 for the members of the population included in each data set 104.

Still referring to FIGS. 1 and 2, as mentioned supra, each mortality data set 102 may be defined in part to include a group of members taken from the population data set 100 that share a set of demographic data 114. For example, in one embodiment of the method 10, the demographic data 114 includes groups of (1) male smokers; (2) male nonsmokers (3) female smokers; and (4) female nonsmokers). These groups may then be further defined by age. For example, in the disclosed embodiment of the method ages between 18 and 120 may be used to define a total of 412 mortality data sets 102, with each set corresponding group population members having a common age, gender and smoking status. However, as also mentioned supra, it will be appreciated that other demographic data (or combinations thereof) may be used in defining the mortality data sets.

Still referring to FIGS. 1 and 2, to obtain a mortality rate 116 for each mortality data set 102, the population associated with each mortality data set 102 is filtered through different known mortality tables 118 (e.g., 1980 Commissioners Standard Ordinary (CSO), 1994 Group Annuity Reserving (GAR), RP-2000 and 2001 CSO) to obtain a stable population estimate. For example, if a mortality data set 102 is defined to include 1,000 males, age 25, non-smoker, that data set 102 may be filtered as follows: 10% CSO, 40% GAR, 25% RP-2000 and 25% 2001 CSO. More specifically, in one non-limiting example the manner of filtering the members through the several mortality tables 118 to obtain a mortality rate 116 for that mortality data set 104 may be calculated using the follow (population) model:

```
CalcMort [sns_, sex_, age_, num_] :=
If[ sex == 1,
    If[ sns ==
        0,
        (mm80per*(num*((mn80[[age - 17]]/1000)*
 mn80lng))) + (mm01per*(num*((mn01[[age - 17]]/1000)*
 mn01lng))) + (mm94per*(num*((mn94[[age - 17]]/1000)*
 mn94lng))) + (mm2kper*(num*((mn2k[[age - 17]]/1000)*mn2klng))),
        (mm80per*(num*((ms80[[age - 17]]/1000)*
 ms80lng))) + (mm01per*(num*((ms01[[age - 17]]/1000)*
 ms01lng))) + (mm94per*(num*((ms94[[age - 17]]/1000)*
 ms94lng))) + (mm2kper*(num*((ms2k[[age - 17]]/1000)*ms2klng)))
    ],
    If[ sns ==
        0,
        (fm80per*(num*((fn80[[age - 17]]/1000)*
 fn80lng))) + (fm01per*(num*((fn01[[age - 17]]/1000)*
 fn01lng))) + (fm94per*(num*((fn94[[age - 17]]/1000)*
 fn94lng))) + (fm2kper*(num*((fn2k[[age - 17]]/1000)*fn2klng))),
        (fm80per*(num*((fs80[[age - 17]]/1000)*
 fs80lng))) + (fm01per*(num*((fs01[[age - 17]]/1000)*
 fs01lng))) + (fm94per*(num*((fs94[[age - 17]]/1000)*
 fs94lng))) + (fm2kper*(num*((fs2k[[age - 17]]/1000)*fs2klng)))
    ]
];
```

In which
sns=smoking or non smoking value
sex=male or female
age=age
num=number of people in that age/sex/smoking group
Male Non Smoker
a. mm80per=percentage of people to use the CSO 80 tables
b. mn80=mortality for the specific age/sex/smoking (e.g.—mortality for 45 year old female smoker)
c. mn80lng=the +/− of to applied to mortality for the CSO 80 table
d. mm01per=percentage of people to use the CSO 2001 tables
e. mn01=mortality for the specific age/sex/smoking (e.g.—mortality for 45 year old female smoker)
f. mn01lng=the +/− of to applied to mortality for the CSO 2001 table
g. mm94per=percentage of people to use the CSO 94 tables
h. mn94=mortality for the specific age/sex/smoking (e.g.—mortality for 45 year old female smoker)

i. mn94lng=the +/− of to applied to mortality for the CSO 94 table
j. mm2kper=percentage of people to use the CSO RP2000 tables
k. nm2k=mortality for the specific age/sex/smoking (e.g.—mortality for 45 year old female smoker)
l. mn2klng=the +/− of to applied to mortality for the CSO RP2000 table Male Smoker
a. mm80per=percentage of people to use the CSO 80 tables
b. ms80=mortality for the specific age/sex/smoking (e.g.—mortality for 45 year old female smoker)
c. ms80lng=the +/− of to applied to mortality for the CSO 80 table
d. mm01per=percentage of people to use the CSO 2001 tables
e. ms01=mortality for the specific age/sex/smoking (e.g.—mortality for 45 year old female smoker)
f. ms01lng=the +/− of to applied to mortality for the CSO 2001 table
g. mm94per=percentage of people to use the CSO 94 tables
h. ms94=mortality for the specific age/sex/smoking (e.g.—mortality for 45 year old female smoker)
i. ms94lng=the +/− of to applied to mortality for the CSO 94 table
j. mm2kper=percentage of people to use the CSO RP2000 tables
k. ms2k=mortality for the specific age/sex/smoking (e.g.—mortality for 45 year old female smoker)
l. ms2klng=the +/− of to applied to mortality for the CSO RP2000 table Female Non Smoker
a. fm80per=percentage of people to use the CSO 80 tables
b. fn80=mortality for the specific age/sex/smoking (e.g.—mortality for 45 year old female smoker)
c. fn80lng=the +/− of to applied to mortality for the CSO 80 table
d. fm01per=percentage of people to use the CSO 2001 tables
e. fn01=mortality for the specific age/sex/smoking (e.g.—mortality for 45 year old female smoker)
f. fn01lng=the +/− of to applied to mortality for the CSO 2001 table
g. fm94per=percentage of people to use the CSO 94 tables
h. fn94=mortality for the specific age/sex/smoking (e.g.—mortality for 45 year old female smoker)
i. fn94lng=the +/− of to applied to mortality for the CSO 94 table
j. fm2kper=percentage of people to use the CSO RP2000 tables
k. fn2k=mortality for the specific age/sex/smoking (e.g.—mortality for 45 year old female smoker)
l. fn2klng=the +/− of to applied to mortality for the CSO RP2000 table Female Smoker
a. fm80per=percentage of people to use the CSO 80 tables
b. fs80=mortality for the specific age/sex/smoking (e.g.—mortality for 45 year old female smoker)
c. fs80lng=the +/− of to applied to mortality for the CSO 80 table
d. fm01per=percentage of people to use the CSO 2001 tables
e. fs01=mortality for the specific age/sex/smoking (e.g.—mortality for 45 year old female smoker)
f. fs01lng=the +/− of to applied to mortality for the CSO 2001 table
g. fm94per=percentage of people to use the CSO 94 tables
h. fs94=mortality for the specific age/sex/smoking (e.g.—mortality for 45 year old female smoker)
i. fs94lng=the +/− of to applied to mortality for the CSO 94 table
j. fm2kper=percentage of people to use the CSO RP2000 tables
k. fs2k=mortality for the specific age/sex/smoking (e.g.—mortality for 45 year old female smoker)
l. fs2klng=the +/− of to applied to mortality for the CSO RP2000 table It will be appreciated that each mortality data set 102 may comprise a mortality rate 116 for the members of the population associated with the data set 102 that is based upon a blend of the mortality models obtained from different mortality tables 118. If this blending of data results in a stable population (i.e., a population having an expected or reasonable death rate) it is accepted. If the mortality data set 102 does not result in a stable population, then the mortality data set 102 may be recalculated using different percentages of the population group as determined by the user until a stable model is achieved.

Referring now to FIG. 1, the disclosed method 10 may include as a further step the generation 14 of a financial target data set 104. This financial target data set 104 may include the population data set 100. It may also indicate, for each mortality data set 102, what the per member life insurance benefit will need to be, on an average basis per member, in order to meet a revenue target for the unfunded mandate. More specifically, prior to the generation 14 of the financial target data set 104, financial projection data may be input into the computer readable electronic storage module of the computer server. This projection data may be transmitted to the server by, for example, the entity responsible for the unfunded liability. It may include a funding target for the unfunded liability (i.e., the amount necessary to meet an estimated shortfall or need), an expected rate of return for each life insurance policy, and described any bonus insurance coverage (see infra) that may be offered to the population members beyond that required to fund the liability (i.e., additional coverage that is paid for by a sponsor (e.g. as an employment incentive) but the benefit is provided to member/employee's family).

Still referring now to FIG. 1, as mentioned supra, using the financial projection data, the financial target data 104 set may indicate the amount of return required to be earned over time on an insurance policy taken out on each member of each mortality data set to meet a funding target of the unfunded liability. In one non-limiting example, this per member life insurance benefit may be calculated as follows:

```
If[useroi == True,
(If[yrs2 == 20, (sol = Solve[uaal == Yr20ROP + (
  yr1roi = (sdx*1000*yr1deaths)*(1 + d01);
  yr2roi = ((sdx*1000*yr2deaths) + yr1roi)*(1 + d02);
  yr3roi = ((sdx*1000*yr3deaths) + yr2roi)*(1 + d03);
  yr4roi = ((sdx*1000*yr4deaths) + yr3roi)*(1 + d04);
  yr5roi = ((sdx*1000*yr5deaths) + yr4roi)*(1 + d05);
  yr6roi = ((sdx*1000*yr6deaths) + yr5roi)*(1 + d06);
  yr7roi = ((sdx*1000*yr7deaths) + yr6roi)* (1 + d07);
  yr8roi = ((sdx*1000*yr8deaths) + yr7roi)*(1 + d08);
  yr9roi = ((sdx*1000*yr9deaths) + yr8roi)*(1 + d09);
  yr10roi = ((sdx*1000*yr10deaths) + yr9roi)*(1 + d10);
  yr11roi = ((sdx*1000*yr11deaths) + yr10roi)*(1 + d11);
  yr12roi = ((sdx*1000*yr12deaths) + yr11roi)*(1 + d12);
  yr13roi = ((sdx*1000*yr13deaths) + yr12roi)*(1 + d13);
  yr14roi = ((sdx*1000*yr14deaths) + yr13roi)*(1 + d14);
  yr15roi = ((sdx*1000*yr15deaths) + yr14roi)*(1 + d15);
  yr16roi = ((sdx*1000*yr16deaths) + yr15roi)*(1 + d16);
  yr17roi = ((sdx*1000*yr17deaths) + yr16roi)*(1 + d17);
```

-continued

```
    yr18roi = ((sdx*1000*yr18deaths) + yr17roi)*(1 + d18);
    yr19roi = ((sdx*1000*yr19deaths) + yr18roi)*(1 + d19);
    yr20roi = ((sdx*1000*yr20deaths) + yr19roi)*(1 + d20)), sdx])];
If[yrs2 ==
  25, (sol =
    Solve[uaal == Yr25ROP + (yr1roi = (sdx*1000*yr1deaths)*(1 + d01);
    yr2roi = ((sdx*1000*yr2deaths) + yr1roi)*(1 + d02);
    yr3roi = ((sdx*1000*yr3deaths) + yr2roi)*(1 + d03);
    yr4roi = ((sdx*1000*yr4deaths) + yr3roi)*(1 + d04);
    yr5roi = ((sdx*1000*yr5deaths) + yr4roi)*(1 + d05);
    yr6roi = ((sdx*1000*yr6deaths) + yr5roi)*(1 + d06);
    yr7roi = ((sdx*1000*yr7deaths) + yr6roi)*(1 + d07);
    yr8roi = ((sdx*1000*yr8deaths) + yr7roi)*(1 + d08);
    yr9roi = ((sdx*1000*yr9deaths) + yr8roi)*(1 + d09);
    yr10roi = ((sdx*1000*yr10deaths) + yr9roi)*(1 + d10);
    yr11roi = ((sdx*1000*yr11deaths) + yr10roi)*(1 + d11);
    yr12roi = ((sdx*1000*yr12deaths) + yr11roi)*(1 + d12);
    yr13roi = ((sdx*1000*yr13deaths) + yr12roi)*(1 + d13);
    yr14roi = ((sdx*1000*yr14deaths) + yr13roi)*(1 + d14);
    yr15roi = ((sdx*1000*yr15deaths) + yr14roi)*(1 + d15);
    yr16roi = ((sdx*1000*yr16deaths) + yr15roi)*(1 + d16);
    yr17roi = ((sdx*1000*yr17deaths) + yr16roi)*(1 + d17);
    yr18roi = ((sdx*1000*yr18deaths) + yr17roi)*(1 + d18);
    yr19roi = ((sdx*1000*yr19deaths) + yr18roi)*(1 + d19);
    yr20roi = ((sdx*1000*yr20deaths) + yr19roi)*(1 + d20);
    yr21roi = ((sdx*1000*yr21deaths) + yr20roi)*(1 + d21);
    yr22roi = ((sdx*1000*yr22deaths) + yr21roi)*(1 + d22);
    yr23roi = ((sdx*1000*yr23deaths) + yr22roi)*(1 + d23);
    yr24roi = ((sdx*1000*yr24deaths) + yr23roi)*(1 + d24);
yr25roi = ((sdx*1000*yr25deaths) + yr24roi)*(1 + d25)), sdx])];
If[yrs2 ==
  30, (sol =
    Solve[uaal == Yr30ROP + (yr1roi = (sdx*1000*yr1deaths)*(1 + d01);
    yr2roi = ((sdx*1000*yr2deaths) + yr1roi)*(1 + d02);
    yr3roi = ((sdx*1000*yr3deaths) + yr2roi)*(1 + d03);
    yr4roi = ((sdx*1000*yr4deaths) + yr3roi)*(1 + d04);
    yr5roi = ((sdx*1000*yr5deaths) + yr4roi)*(1 + d05);
    yr6roi = ((sdx*1000*yr6deaths) + yr5roi)*(1 + d06);
    yr7roi = ((sdx*1000*yr7deaths) + yr6roi)*(1 + d07);
    yr8roi = ((sdx*1000*yr8deaths) + yr7roi)*(1 + d08);
    yr9roi = ((sdx*1000*yr9deaths) + yr8roi)*(1 + d09);
    yr10roi = ((sdx*1000*yr10deaths) + yr9roi)*(1 + d10);
    yr11roi = ((sdx*1000*yr11deaths) + yr10roi)*(1 + d11);
    yr12roi = ((sdx*1000*yr12deaths) + yr11roi)*(1 + d12);
    yr13roi = ((sdx*1000*yr13deaths) + yr12roi)*(1 + d13);
    yr14roi = ((sdx*1000*yr14deaths) + yr13roi)*(1 + d14);
    yr15roi = ((sdx*1000*yr15deaths) + yr14roi)*(1 + d15);
    yr16roi = ((sdx*1000*yr16deaths) + yr15roi)*(1 + d16);
    yr17roi = ((sdx*1000*yr17deaths) + yr16roi)*(1 + d17);
    yr18roi = ((sdx*1000*yr18deaths) + yr17roi)*(1 + d18);
    yr19roi = ((sdx*1000*yr19deaths) + yr18roi)*(1 + d19);
    yr20roi = ((sdx*1000*yr20deaths) + yr19roi)*(1 + d20);
    yr21roi = ((sdx*1000*yr21deaths) + yr20roi)*(1 + d21);
    yr22roi = ((sdx*1000*yr22deaths) + yr21roi)*(1 + d22);
    yr23roi = ((sdx*1000*yr23deaths) + yr22roi)*(1 + d23);
    yr24roi = ((sdx*1000*yr24deaths) + yr23roi)*(1 + d24);
    yr25roi = ((sdx*1000*yr25deaths) + yr24roi)*(1 + d25);
    yr26roi = ((sdx*1000*yr26deaths) + yr25roi)*(1 + d26);
    yr27roi = ((sdx*1000*yr27deaths) + yr26roi)*(1 + d27);
    yr28roi = ((sdx*1000*yr28deaths) + yr27roi)*(1 + d28);
    yr29roi = ((sdx*1000*yr29deaths) + yr28roi)*(1 + d29);
    yr30roi = ((sdx*1000*yr30deaths) + yr29roi)*(1 + d30)), sdx])];
If[yrs2 ==
  40, (sol =
    Solve[uaal == Yr40ROP + (yr1roi = (sdx*1000*yr1deaths)*(1 + d01);
    yr2roi = ((sdx*1000*yr2deaths) + yr1roi)*(1 + d02);
    yr3roi = ((sdx*1000*yr3deaths) + yr2roi)*(1 + d03);
    yr4roi = ((sdx*1000*yr4deaths) + yr3roi)*(1 + d04);
    yr5roi = ((sdx*1000*yr5deaths) + yr4roi)*(1 + d05);
    yr6roi = ((sdx*1000*yr6deaths) + yr5roi)*(1 + d06);
    yr7roi = ((sdx*1000*yr7deaths) + yr6roi)*(1 + d07);
    yr8roi = ((sdx*1000*yr8deaths) + yr7roi)*(1 + d08);
    yr9roi = ((sdx*1000*yr9deaths) + yr8roi)*(1 + d09);
    yr10roi = ((sdx*1000*yr10deaths) + yr9roi)*(1 + d10);
    yr11roi = ((sdx*1000*yr11deaths) + yr10roi)*(1 + d11);
    yr12roi = ((sdx*1000*yr12deaths) + yr11roi)*(1 + d12);
    yr13roi = ((sdx*1000*yr13deaths) + yr12roi)*(1 + d13);
    yr14roi = ((sdx*1000*yr14deaths) + yr13roi)*(1 + d14);
    yr15roi = ((sdx*1000*yr15deaths) + yr14roi)*(1 + d15);
    yr16roi = ((sdx*1000*yr16deaths) + yr15roi)*(1 + d16);
```

-continued

```
    yr17roi = ((sdx*1000*yr17deaths) + yr16roi)*(1 + d17);
    yr18roi = ((sdx*1000*yr18deaths) + yr17roi)*(1 + d18);
    yr19roi = ((sdx*1000*yr19deaths) + yr18roi)*(1 + d19);
    yr20roi = ((sdx*1000*yr20deaths) + yr19roi)*(1 + d20);
    yr21roi = ((sdx*1000*yr21deaths) + yr20roi)*(1 + d21);
    yr22roi = ((sdx*1000*yr22deaths) + yr21roi)*(1 + d22);
    yr23roi = ((sdx*1000*yr23deaths) + yr22roi)*(1 + d23);
    yr24roi = ((sdx*1000*yr24deaths) + yr23roi)*(1 + d24);
    yr25roi = ((sdx*1000*yr25deaths) + yr24roi)*(1 + d25);
    yr26roi = ((sdx*1000*yr26deaths) + yr25roi)*(1 + d26);
    yr27roi = ((sdx*1000*yr27deaths) + yr26roi)*(1 + d27);
    yr28roi = ((sdx*1000*yr28deaths) + yr27roi)*(1 + d28);
    yr29roi = ((sdx*1000*yr29deaths) + yr28roi)*(1 + d29);
    yr30roi = ((sdx*1000*yr30deaths) + yr29roi)*(1 + d30);
    yr31roi = ((sdx*1000*yr31deaths) + yr30roi)*(1 + d31);
    yr32roi = ((sdx*1000*yr32deaths) + yr31roi)*(1 + d32);
    yr33roi = ((sdx*1000*yr33deaths) + yr32roi)*(1 + d33);
    yr34roi = ((sdx*1000*yr34deaths) + yr33roi)*(1 + d34);
    yr35roi = ((sdx*1000*yr35deaths) + yr34roi)*(1 + d35);
    yr36roi = ((sdx*1000*yr36deaths) + yr35roi)* (1 + d36);
    yr37roi = ((sdx*1000*yr37deaths) + yr36roi)*(1 + d37);
    yr38roi = ((sdx*1000*yr38deaths) + yr37roi)*(1 + d38);
    yr39roi = ((sdx*1000*yr39deaths) + yr38roi)*(1 + d39);
    yr40roi = ((sdx*1000*yr40deaths) + yr39roi)*(1 + d40)), sdx])];
If[yrs2 ==
  50, (sol =
    Solve[uaal = Yr50ROP + (yr1roi = (sdx*1000*yr1deaths)*(1 + d01);
    yr2roi = ((sdx*1000*yr2deaths) + yr1roi)*(1 + d02);
    yr3roi = ((sdx*1000*yr3deaths) + yr2roi)*(1 + d03);
    yr4roi = ((sdx*1000*yr4deaths) + yr3roi)*(1 + d04);
    yr5roi = ((sdx*1000*yr5deaths) + yr4roi)*(1 + d05);
    yr6roi = ((sdx*1000*yr6deaths) + yr5roi)*(1 + d06);
    yr7roi = ((sdx*1000*yr7deaths) + yr6roi)*(1 + d07);
    yr8roi = ((sdx*1000*yr8deaths) + yr7roi)*(1 + d08);
    yr9roi = ((sdx*1000*yr9deaths) + yr8roi)*(1 + d09);
    yr10roi = ((sdx*1000*yr10deaths) + yr9roi)*(1 + d10);
    yr11roi = ((sdx*1000*yr11deaths) + yr10roi)*(1 + d11);
    yr12roi = ((sdx*1000*yr12deaths) + yr11roi)*(1 + d12);
    yr13roi = ((sdx*1000*yr13deaths) + yr12roi)*(1 + d13);
    yr14roi = ((sdx*1000*yr14deaths) + yr13roi)*(1 + d14);
    yr15roi = ((sdx*1000*yr15deaths) + yr14roi)*(1 + d15);
    yr16roi = ((sdx*1000*yr16deaths) + yr15roi)*(1 + d16);
    yr17roi = ((sdx*1000*yr17deaths) + yr16roi)*(1 + d17);
    yr18roi = ((sdx*1000*yr18deaths) + yr17roi)*(1 + d18);
    yr19roi = ((sdx*1000*yr19deaths) + yr18roi)*(1 + d19);
    yr20roi = ((sdx*1000*yr20deaths) + yr19roi)*(1 + d20);
    yr21roi = ((sdx*1000*yr21deaths) + yr20roi)*(1 + d21);
    yr22roi = ((sdx*1000*yr22deaths) + yr21roi)*(1 + d22);
    yr23roi = ((sdx*1000*yr23deaths) + yr22roi)*(1 + d23);
    yr24roi = ((sdx*1000*yr24deaths) + yr23roi)*(1 + d24);
    yr25roi = ((sdx*1000*yr25deaths) + yr24roi)*(1 + d25);
    yr26roi = ((sdx*1000*yr26deaths) + yr25roi)*(1 + d26);
    yr27roi = ((sdx*1000*yr27deaths) + yr26roi)*(1 + d27);
    yr28roi = ((sdx*1000*yr28deaths) + yr27roi)*(1 + d28);
    yr29roi = ((sdx*1000*yr29deaths) + yr28roi)*(1 + d29);
    yr30roi = ((sdx*1000*yr30deaths) + yr29roi)*(1 + d30);
    yr31roi = ((sdx*1000*yr31deaths) + yr30roi)*(1 + d31);
    yr32roi = ((sdx*1000*yr32deaths) + yr31roi)*(1 + d32);
    yr33roi = ((sdx*1000*yr33deaths) + yr32roi)*(1 + d33);
    yr34roi = ((sdx*1000*yr34deaths) + yr33roi)*(1 + d34);
    yr35roi = ((sdx*1000*yr35deaths) + yr34roi)*(1 + d35);
    yr36roi = ((sdx*1000*yr36deaths) + yr35roi)*(1 + d36);
    yr37roi = ((sdx*1000*yr37deaths) + yr36roi)*(1 + d37);
    yr38roi = ((sdx*1000*yr38deaths) + yr37roi)*(1 + d38);
    yr39roi = ((sdx*1000*yr39deaths) + yr38roi)*(1 + d39);
    yr40roi = ((sdx*1000*yr40deaths) + yr39roi)*(1 + d40);
    yr41roi = ((sdx*1000*yr41deaths) + yr40roi)*(1 + d41);
    yr42roi = ((sdx*1000*yr42deaths) + yr41roi)*(1 + d42);
    yr43roi = ((sdx*1000*yr43deaths) + yr42roi)*(1 + d43);
    yr44roi = ((sdx*1000*yr44deaths) + yr43roi)*(1 + d44);
    yr45roi = ((sdx*1000*yr45deaths) + yr44roi)*(1 + d45);
    yr46roi = ((sdx*1000*yr46deaths) + yr45roi)*(1 + d46);
    yr47roi = ((sdx*1000*yr47deaths) + yr46roi)*(1 + d47);
    yr48roi = ((sdx*1000*yr48deaths) + yr47roi)*(1 + d48);
    yr49roi = ((sdx*1000*yr49deaths) + yr48roi)*(1 + d49);
    yr50roi = ((sdx*1000*yr50deaths) + yr49roi)*(1 + d50)), sdx])];),
  (If[yrs2 ==
    20, (sol = Solve[uaal == Yr20ROP + (yr1roi = (sdx*1000*yr1deaths);
    yr2roi = ((sdx*1000*yr2deaths) + yr1roi);
    yr3roi = ((sdx*1000*yr3deaths) + yr2roi);
```

-continued

```
   yr4roi = ((sdx*1000*yr4deaths) + yr3roi);
   yr5roi = ((sdx*1000*yr5deaths) + yr4roi);
   yr6roi = ((sdx*1000*yr6deaths) + yr5roi);
   yr7roi = ((sdx*1000*yr7deaths) + yr6roi);
   yr8roi = ((sdx*1000*yr8deaths) + yr7roi);
   yr9roi = ((sdx*1000*yr9deaths) + yr8roi);
   yr10roi = ((sdx*1000*yr10deaths) + yr9roi);
   yr11roi = ((sdx*1000*yr11deaths) + yr10roi);
   yr12roi = ((sdx*1000*yr12deaths) + yr11roi);
   yr13roi = ((sdx*1000*yr13deaths) + yr12roi);
   yr14roi = ((sdx*1000*yr14deaths) + yr13roi);
   yr15roi = ((sdx*1000*yr15deaths) + yr14roi);
   yr16roi = ((sdx*1000*yr16deaths) + yr15roi);
   yr17roi = ((sdx*1000*yr17deaths) + yr16roi);
   yr18roi = ((sdx*1000*yr18deaths) + yr17roi);
   yr19roi = ((sdx*1000*yr19deaths) + yr18roi);
   yr20roi = ((sdx*1000*yr20deaths) + yr19roi);
   yr21roi = ((sdx*1000*yr21deaths) + yr20roi)), sdx])];
If[yrs2 ==
   25, (sol = Solve[uaal = Yr25ROP + (yr1roi = (sdx*1000*yr1deaths);
   yr2roi = ((sdx*1000*yr2deaths) + yr1roi);
   yr3roi = ((sdx*1000*yr3deaths) + yr2roi);
   yr4roi = ((sdx*1000*yr4deaths) + yr3roi);
   yr5roi = ((sdx*1000*yr5deaths) + yr4roi);
   yr6roi = ((sdx*1000*yr6deaths) + yr5roi);
   yr7roi = ((sdx*1000*yr7deaths) + yr6roi);
   yr8roi = ((sdx*1000*yr8deaths) + yr7roi);
   yr9roi = ((sdx*1000*yr9deaths) + yr8roi);
   yr10roi = ((sdx*1000*yr10deaths) + yr9roi);
   yr11roi = ((sdx*1000*yr11deaths) + yr10roi);
   yr12roi = ((sdx*1000*yr12deaths) + yr11roi);
   yr13roi = ((sdx*1000*yr13deaths) + yr12roi);
   yr14roi = ((sdx*1000*yr14deaths) + yr13roi);
   yr15roi = ((sdx*1000*yr15deaths) + yr14roi);
   yr16roi = ((sdx*1000*yr16deaths) + yr15roi);
   yr17roi = ((sdx*1000*yr17deaths) + yr16roi);
   yr18roi = ((sdx*1000*yr18deaths) + yr17roi);
   yr19roi = ((sdx*1000*yr19deaths) + yr18roi);
   yr20roi = ((sdx*1000*yr20deaths) + yr19roi);
   yr21roi = ((sdx*1000*yr21deaths) + yr20roi);
   yr22roi = ((sdx*1000*yr22deaths) + yr21roi);
   yr23roi = ((sdx*1000*yr23deaths) + yr22roi);
   yr24roi = ((sdx*1000*yr24deaths) + yr23roi);
   yr25roi = ((sdx*1000*yr25deaths) + yr24roi);
   yr26roi = ((sdx*1000*yr26deaths) + yr25roi)), sdx])];
If[yrs2 ==
   30, (sol = Solve[uaal == Yr30ROP + (yr1roi = (sdx*1000*yr1deaths);
   yr2roi = ((sdx*1000*yr2deaths) + yr1roi);
   yr3roi = ((sdx*1000*yr3deaths) + yr2roi);
   yr4roi = ((sdx*1000*yr4deaths) + yr3roi);
   yr5roi = ((sdx*1000*yr5deaths) + yr4roi);
   yr6roi = ((sdx*1000*yr6deaths) + yr5roi);
   yr7roi = ((sdx*1000*yr7deaths) + yr6roi);
   yr8roi = ((sdx*1000*yr8deaths) + yr7roi);
   yr9roi = ((sdx*1000*yr9deaths) + yr8roi);
   yr10roi = ((sdx*1000*yr10deaths) + yr9roi);
   yr11roi = ((sdx*1000*yr11deaths) + yr10roi);
   yr12roi = ((sdx*1000*yr12deaths) + yr11roi);
   yr13roi = ((sdx*1000*yr13deaths) + yr12roi);
   yr14roi = ((sdx*1000*yr14deaths) + yr13roi);
   yr15roi = ((sdx*1000*yr15deaths) + yr14roi);
   yr16roi = ((sdx*1000*yr16deaths) + yr15roi);
   yr17roi = ((sdx*1000*yr17deaths) + yr16roi);
   yr18roi = ((sdx*1000*yr18deaths) + yr17roi);
   yr19roi = ((sdx*1000*yr19deaths) + yr18roi);
   yr20roi = ((sdx*1000*yr20deaths) + yr19roi);
   yr21roi = ((sdx*1000*yr21deaths) + yr20roi);
   yr22roi = ((sdx*1000*yr22deaths) + yr21roi);
   yr23roi = ((sdx*1000*yr23deaths) + yr22roi);
   yr24roi = ((sdx*1000*yr24deaths) + yr23roi);
   yr25roi = ((sdx*1000*yr25deaths) + yr24roi);
   yr26roi = ((sdx*1000*yr26deaths) + yr25roi);
   yr27roi = ((sdx*1000*yr27deaths) + yr26roi);
   yr28roi = ((sdx*1000*yr28deaths) + yr27roi);
   yr29roi = ((sdx*1000*yr29deaths) + yr28roi);
   yr30roi = ((sdx*1000*yr30deaths) + yr29roi)), sdx])];
If[yrs2 ==
   40, (sol = Solve[uaal == Yr40ROP + (yr1roi = (sdx*1000*yr1deaths);
   yr2roi = ((sdx*1000*yr2deaths) + yr1roi);
   yr3roi = ((sdx*1000*yr3deaths) + yr2roi);
   yr4roi = ((sdx*1000*yr4deaths) + yr3roi);
   yr5roi = ((sdx*1000*yr5deaths) + yr4roi);
   yr6roi = ((sdx*1000*yr6deaths) + yr5roi);
   yr7roi = ((sdx*1000*yr7deaths) + yr6roi);
   yr8roi = ((sdx*1000*yr8deaths) + yr7roi);
   yr9roi = ((sdx*1000*yr9deaths) + yr8roi);
   yr10roi = ((sdx*1000*yr10deaths) + yr9roi);
   yr11roi = ((sdx*1000*yr11deaths) + yr10roi);
   yr12roi = ((sdx*1000*yr12deaths) + yr11roi);
   yr13roi = ((sdx*1000*yr13deaths) + yr12roi);
   yr14roi = ((sdx*1000*yr14deaths) + yr13roi);
   yr15roi = ((sdx*1000*yr15deaths) + yr14roi);
   yr16roi = ((sdx*1000*yr16deaths) + yr15roi);
   yr17roi = ((sdx*1000*yr17deaths) + yr16roi);
   yr18roi = ((sdx*1000*yr18deaths) + yr17roi);
   yr19roi = ((sdx*1000*yr19deaths) + yr18roi);
   yr20roi = ((sdx*1000*yr20deaths) + yr19roi);
   yr21roi = ((sdx*1000*yr21deaths) + yr20roi);
   yr22roi = ((sdx*1000*yr22deaths) + yr21roi);
   yr23roi = ((sdx*1000*yr23deaths) + yr22roi);
   yr24roi = ((sdx*1000*yr24deaths) + yr23roi);
   yr25roi = ((sdx*1000*yr25deaths) + yr24roi);
   yr26roi = ((sdx*1000*yr26deaths) + yr25roi);
   yr27roi = ((sdx*1000*yr27deaths) + yr26roi);
   yr28roi = ((sdx*1000*yr28deaths) + yr27roi);
   yr29roi = ((sdx*1000*yr29deaths) + yr28roi);
   yr30roi = ((sdx*1000*yr30deaths) + yr29roi);
   yr31roi = ((sdx*1000*yr31deaths) + yr30roi);
   yr32roi = ((sdx*1000*yr32deaths) + yr31roi);
   yr33roi = ((sdx*1000*yr33deaths) + yr32roi);
   yr34roi = ((sdx*1000*yr34deaths) + yr33roi);
   yr35roi = ((sdx*1000*yr35deaths) + yr34roi);
   yr36roi = ((sdx*1000*yr36deaths) + yr35roi);
   yr37roi = ((sdx*1000*yr37deaths) + yr36roi);
   yr38roi = ((sdx*1000*yr38deaths) + yr37roi);
   yr39roi = ((sdx*1000*yr39deaths) + yr38roi);
   yr40roi = ((sdx*1000*yr40deaths) + yr39roi);), sdx])];
If[yrs2 ==
   50, (sol = Solve[uaal == Yr50ROP + (yr1roi = (sdx*1000*yr1deaths);
   yr2roi = ((sdx*1000*yr2deaths) + yr1roi);
   yr3roi = ((sdx*1000*yr3deaths) + yr2roi);
   yr4roi = ((sdx*1000*yr4deaths) + yr3roi);
   yr5roi = ((sdx*1000*yr5deaths) + yr4roi);
   yr6roi = ((sdx*1000*yr6deaths) + yr5roi);
   yr7roi = ((sdx*1000*yr7deaths) + yr6roi);
   yr8roi = ((sdx*1000*yr8deaths) + yr7roi);
   yr9roi = ((sdx*1000*yr9deaths) + yr8roi);
   yr10roi = ((sdx*1000*yr10deaths) + yr9roi);
   yr11roi = ((sdx*1000*yr11deaths) + yr10roi);
   yr12roi = ((sdx*1000*yr12deaths) + yr11roi);
   yr13roi = ((sdx*1000*yr13deaths) + yr12roi);
   yr14roi = ((sdx*1000*yr14deaths) + yr13roi);
   yr15roi = ((sdx*1000*yr15deaths) + yr14roi);
   yr16roi = ((sdx*1000*yr16deaths) + yr15roi);
   yr17roi = ((sdx*1000*yr17deaths) + yr16roi);
   yr18roi = ((sdx*1000*yr18deaths) + yr17roi);
   yr19roi = ((sdx*1000*yr19deaths) + yr18roi);
   yr20roi = ((sdx*1000*yr20deaths) + yr19roi);
   yr21roi = ((sdx*1000*yr21deaths) + yr20roi);
   yr22roi = ((sdx*1000*yr22deaths) + yr21roi);
   yr23roi = ((sdx*1000*yr23deaths) + yr22roi);
   yr24roi = ((sdx*1000*yr24deaths) + yr23roi);
   yr25roi = ((sdx*1000*yr25deaths) + yr24roi);
   yr26roi = ((sdx*1000*yr26deaths) + yr25roi);
   yr27roi = ((sdx*1000*yr27deaths) + yr26roi);
   yr28roi = ((sdx*1000*yr28deaths) + yr27roi);
   yr29roi = ((sdx*1000*yr29deaths) + yr28roi);
   yr30roi = ((sdx*1000*yr30deaths) + yr29roi);
   yr31roi = ((sdx*1000*yr31deaths) + yr30roi);
   yr32roi = ((sdx*1000*yr32deaths) + yr31roi);
   yr33roi = ((sdx*1000*yr33deaths) + yr32roi);
   yr34roi = ((sdx*1000*yr34deaths) + yr33roi);
   yr35roi = ((sdx*1000*yr35deaths) + yr34roi);
   yr36roi = ((sdx*1000*yr36deaths) + yr35roi);
   yr37roi = ((sdx*1000*yr37deaths) + yr36roi);
   yr38roi = ((sdx*1000*yr38deaths) + yr37roi);
   yr39roi = ((sdx*1000*yr39deaths) + yr38roi);
   yr40roi = ((sdx*1000*yr40deaths) + yr39roi);
   yr41roi = ((sdx*1000*yr41deaths) + yr40roi);
   yr42roi = ((sdx*1000*yr42deaths) + yr41roi);
```

-continued

```
yr43roi = ((sdx*1000*yr43deaths) + yr42roi);
yr44roi = ((sdx*1000*yr44deaths) + yr43roi);
yr45roi = ((sdx*1000*yr45deaths) + yr44roi);
yr46roi = ((sdx*1000*yr46deaths) + yr45roi);
yr47roi = ((sdx*1000*yr47deaths) + yr46roi);
yr48roi = ((sdx*1000*yr48deaths) + yr47roi);
yr49roi = ((sdx*1000*yr49deaths) + yr48roi);
yr50roi = ((sdx*1000*yr50deaths) + yr49roi);
), sdx])];)];
```

Wherein:
useroi=solve for death benefit that takes into consideration reinvesting of death benefits to meet financial target
yrs2=years in program
sdx=the variable to solve for which equates to the death benefit
uaal=financial target (e.g. $50 billion)
YrXXROP=the accumulated value of the premiums that will be provided to the client if they choose to use a return of premium life insurance product
yrXdeaths=the number of deaths for year X as calculated by mortality modeling
yrXroi=death benefits for year+expected rate of return for year X
dXX=expected return on investment for year XX Still referring to FIG. 1, in another step of the disclosed method 10 the financial target data set 104 is transmitted (from the server) to a plurality of life insurance vendors. The financial target data set may, for example, be transmitted to between 2 and 10 (or more) vendors. However, in the disclosed embodiment of the method a total of 6 vendors are used. As part of, or in addition to, the financial target data set 104, the vendor may be provided with requests for information in at least the following categories: (1) the vendor's relationship with the governmental entity; (2) the customer support provided by the vendor; (3) the vendor's growth rate; (4) the vendor's market share; (5) the vendor's management; (6) vendor's financial state; (7) the vendor's financial heath; (8) the vendor's rank in the market; and (9) the vendor's overall health. This information, or a combination thereof, may also be provided in whole or in part by the governmental entity. Moreover, as will be discussed infra, each vendor's response to the request for information will be weighed (on e.g., a scale of 0 to 1.75) and used in calculating the proportional rating for each vendor.

Figure 3:
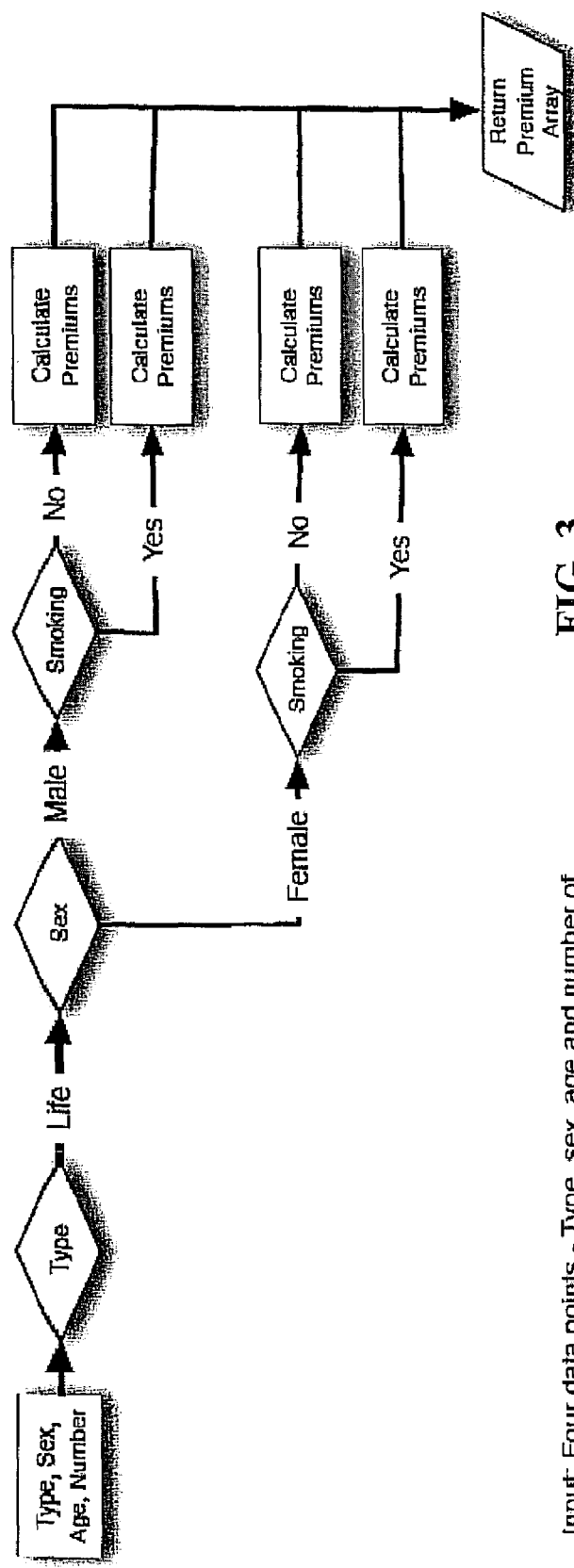
FIG. 3 is a diagrammatic view showing the generation of an array or table including premium information received from the plurality of insurance vendors.

Referring now to FIGS. 1 and 3, in another step of the disclosed method 10 one or more, but preferably at least two life insurance vendors, and still more preferably all the vendors, return and/or transmit rate tables back to the server. Each of these rate tables—which may be combined into a larger array or table (see FIG. 3) may include each vendor's life insurance premium rate per member (e.g., $5.00 per $1,000 of benefit) for each member of each mortality data set 102. Thus, in the disclosed embodiment each vendor may provide a rate table include 412 separate rate—one for each mortality data set 102.

Referring now to FIG. 1, in another step of the disclosed method 10 may include generating a proportional rating for each insurance vendor. As mentioned supra, this proportional rating may be generated by factoring the weighted response of each vendor to each category of the request for information (on e.g., a scale of 0 to 1.75). Additionally, or alternatively, this proportional rating may be generated by factoring the weighed responses concerning the vendor and/or concerning the needs of the party responsible for the unfunded liability. In one non-limiting example, this proportional rating may be calculated as follows:

$$c1\text{rating}=((r1r*r1r1)+(r2r*r2r1)+(r3r*r3r1)+(r4r*r4r1)+(r5r*r5r1)+(r6r*r6r1)+(r7r*r7r1)+(r8r*r8r1)+(r9r*r9r1)+(r10r*r10r1))/10;$$

$$c2\text{rating}=((r1r*r1r2)+(r2r*r2r2)+(r3r*r3r2)+(r4r*r4r2)+(r5r*r5r2)+(r6r*r6r2)+(r7r*r7r2)+(r8r*r8r2)+(r9r*r9r2)+(r10r*r10r2))/10;$$

$$c3\text{rating}=((r1r*r1r3)+(r2r*r2r3)+(r3r*r3r3)+(r4r*r4r3)+(r5r*r5r3)+(r6r*r6r3)+(r7r*r7r3)+(r8r*r8r3)+(r9r*r9r3)+(r10r*r10r3))/10;$$

$$c4\text{rating}=((r1r*r1r4)+(r2r*r2r4)+(r3r*r3r4)+(r4r*r4r4)+(r5r*r5r4)+(r6r*r6r4)+(r7r*r7r4)+(r8r*r8r4)+(r9r*r9r4)+(r10r*r10r4))/10;$$

$$c5\text{rating}=((r1r*r1r5)+(r2r*r2r5)+(r3r*r3r5)+(r4r*r4r5)+(r5r*r5r5)+(r6r*r6r5)+(r7r*r7r5)+(r8r*r8r5)+(r9r*r9r5)+(r10r*r10r5))/10;$$

$$c6\text{rating}=((r1r*r1r6)+(r2r*r2r6)+(r3r*r3r6)+(r4r*r4r6)+(r5r*r5r6)+(r6r*r6r6)+(r7r*r7r6)+(r8r*r8r6)+(r9r*r9r6)+(r10r*r10r6))/10;$$

$$\text{CalcRating}[ptable\_]:=\{c1\text{rating}*ptable[[1]],c2\text{rating}*ptable[[2]],c3\text{rating}*ptable[[3]],c4\text{rating}*ptable[[4]],c5\text{rating}*ptable[[5]],c6\text{rating}*ptable[[6]]\};$$

In which:
r1r=master category rating 1
r2r=master category rating 2
r3r=master category rating 3
r4r=master category rating 4
r5r=master category rating 5
r6r=master category rating 6
r7r=master category rating 7
r8r=master category rating 8
r9r=master category rating 9
r10r=master category rating 10
r1r1=company 1 rating for master category 1
r2r1=company 1 rating for master category 2
r3r1=company 1 rating for master category 3
r4r1=company 1 rating for master category 4
r5r1=company 1 rating for master category 5
r6r1=company 1 rating for master category 6
r7r1=company 1 rating for master category 7
r8r1=company 1 rating for master category 8
r9r1=company 1 rating for master category 9
r10r1=company 1 rating for master category 10
r1r2=company 2 rating for master category 1
r2r2=company 2 rating for master category 2
r3r2=company 2 rating for master category 3
r4r2=company 2 rating for master category 4
r5r2=company 2 rating for master category 5
r6r2=company 2 rating for master category 6
r7r2=company 2 rating for master category 7
r8r2=company 2 rating for master category 8
r9r2=company 2 rating for master category 9
r10r2=company 2 rating for master category 10
r1r3=company 3 rating for master category 1
r2r3=company 3 rating for master category 2
r3r3=company 3 rating for master category 3
r4r3=company 3 rating for master category 4
r5r3=company 3 rating for master category 5
r6r3=company 3 rating for master category 6
r7r3=company 3 rating for master category 7
r8r3=company 3 rating for master category 8 r9r3=company 3 rating for master category 9
r10r3=company 3 rating for master category 10
r1r1=company 4 rating for master category 1
r2r4=company 4 rating for master category 2
r3r4=company 4 rating for master category 3
r4r4=company 4 rating for master category 4
r5r4=company 4 rating for master category 5
r6r4=company 4 rating for master category 6
r7r4=company 4 rating for master category 7
r8r4=company 4 rating for master category 8
r9r4=company 4 rating for master category 9
r10r4=company 4 rating for master category 10
r1r5=company 5 rating for master category 1
r2r5=company 5 rating for master category 2
r3r5=company 5 rating for master category 3
r4r5=company 5 rating for master category 4
r5r5=company 5 rating for master category 5
r6r5=company 5 rating for master category 6
r7r5=company 5 rating for master category 7
r8r5=company 5 rating for master category 8
r9r5=company 5 rating for master category 9
r10r5=company 5 rating for master category 10
r1r6=company 6 rating for master category 1
r2r6=company 6 rating for master category 2
r3r6=company 6 rating for master category 3
r4r6=company 6 rating for master category 4
r5r6=company 6 rating for master category 5
r6r6=company 6 rating for master category 6
r7r6=company 6 rating for master category 7
r8r6=company 6 rating for master category 8
r9r6=company 6 rating for master category 9
r10r6=company 6 rating for master category 10

Figure 4:
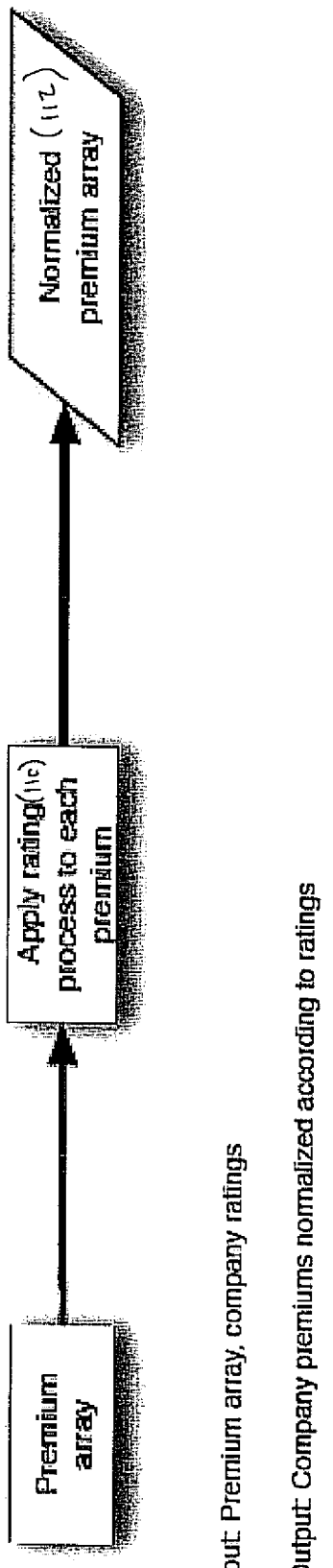
FIG. 4 is a diagrammatic view showing the generation of the final rate array or table.

Referring now to FIGS. 1 and 4, in a further step of the disclosed method 10, a final or normalized rate table (or array) 108 may be generated 22 that may include a per member life insurance premium rate for each mortality data set 102. This rate table 108 may be generated/output as a tangible report, as part of an on-screen display or both. This life insurance premium rate may be selected for each mortality data set 102 from the lowest vendor rate, as adjusted by the proportional rating for that vendor, for that mortality data set. Accordingly, where two vendor's have the same proportional rating, the rate table 108 will include for any given mortality data set 102 the rate of the vendor that is the lowest. However, where two vendor's have the same rate, the table 108 may include for any given mortality data set 102 the rate of the vendor having the most preferred proportional rating. In one non-limiting example, this rate table may be calculated as follows:

Step 1: Calculate premium and create table of table's for each group type (M/F, Smoking/Non)

```
LFFNRates = { }; i = 18; While[i < 121, AppendTo[LFFNRates,
CalcPremTable[1, 0, 0, i, 1]]; i++];
LFFSRates = { }; i = 18; While[i < 121, AppendTo[LFFSRates,
CalcPremTable[1, 0, 1, i, 1]]; i++];
LFMNRates = { }; i = 18; While[i < 121, AppendTo[LFMNRates,
CalcPremTable[1, 1, 0, i, 1]]; i++];< 121,
LFMSRates = { }; i = 18; While[i < 121, AppendTo[LFMSRates,
CalcPremTable[1, 1, 1, i, 1]]; i++];
```

Step 2: Apply ratings to premium table of table's to create a proportionalized premium table of table's for each group type:

```
LFMNprempos = { }; i = 1; While[i < 104, AppendTo[LFMNprempos,
Position[CalcRating[LFMNRates[[i]]],
Min[Cases[Delete[CalcRating[LFMNRates[[i]]],
evcomp], Except[0]]]]]; i++];
LFMSprempos = { }; i = 1; While[i < 104, AppendTo[LFMSprempos,
Position[CalcRating[LFMSRates[[i]]],
Min[Cases[Delete[CalcRating[LFMSRates[[i]]],
evcomp], Except[0]]]]]; i++];
LFFNprempos = { }; i = 1; While[i < 104, AppendTo[LFFNprempos,
Position[CalcRating[LFFNRates[[i]]],
Min[Cases[Delete[CalcRating[LFFNRates[[i]]],
evcomp], Except[0]]]]]; i++];
LFFSprempos = { }; i = 1; While[i < 104, AppendTo[LFFSprempos,
Position[CalcRating[LFFSRates[[i]]],
Min[Cases[Delete[CalcRating[LFFSRates[[i]]],
evcomp], Except[0]]]]]; i++];
```

Step 3: Identify the lowest proportionalized premium table of table's for each group type:

```
LFMNlowprem = { }; i = 1; While[i < 104, AppendTo[LFMNlowprem,
LFMNRates[[i, LFMNprempos[[i, 1, 1]]]]]; i++];
LFMSlowprem = { }; i = 1; While[i < 104, AppendTo[LFMSlowprem,
LFMSRates[[i, LFMSprempos[[i, 1, 1]]]]]; i++];
LFFNlowprem = { }; i = 1; While[i < 104, AppendTo[LFFNlowprem,
LFFNRates[[i, LFFNprempos[[i, 1, 1]]]]]; i++];
LFFSlowprem = { }; i = 1 ; While[i < 104, AppendTo[LFFSlowprem,
LFFSRates[[i, LFFSprempos[[i, 1, 1]]]]]; i++];
```

Step 4: Create premium table of table's of non proportionalized premiums based upon analysis done in step 3 for each group type:

```
LFMNpremposlist = { }; i = 1; While[i < 104,
AppendTo[LFMNpremposlist, LFMNprempos[[i., 1, 1]]]; i++];
LFMSpremposlist = { }; i = 1; While[i < 104,
AppendTo[LFMSpremposlist, LFMSprempos[[i, 1, i]]]; i++];
LFFSpremposlist = { }; i = 1; While[i < 104,
AppendTo[LFFSpremposlist, LFFSprempos[[i, 1, 1]]]; i++];
LFFNpremposlist = { }; i = 1; While[i < 104,
AppendTo[LFFNpremposlist, 1LFFNprempos[[i, 1, ]]]; i++];
```

Example of Using Final Rate Table:

Step 1: Calculate premium and create table of table's for each group type (MIF, Smoking/Non)

LFFNRates={1.1,1.2,1.23,0.9,1,2}

Step 2: Apply ratings to premium table of table's to create a proportionalized premium table of table's for each group type Company 1 rating=1
Company 2 ratings=0.5
Company 3 ratings=1.25
Company 4 ratings=1.3
Company 5 ratings=1
Company 6 ratings=0.75
Proportionalize table={1.1*1, 1.2*0.5, 1.23*1.25, 1.3*0.9, 1*1, 1.2*0.75} or {1.1, 0.6, 1.5375, 1.17, 1, 0.9}
Lowest proportionalized premium is in position 2 (0.6) where non proportionalized lowest premium is in position 4 (0.9)

Step 3: Create table of lowest proportionalized premium positions—in this example a "2" would be captured for this group type/age in the premium table.

Step 4: Create premium table based upon position of premium in the table of premiums for group type—in this example the premium of 1.2 would be added to the premium table and used to calculate the total annual premium for the group type.

Still referring to FIGS. 1 and 4, a separate rate table 108*b* may also be generated 22 that may include a per member bonus life insurance premium rate for each mortality data set 102—it being appreciated that all the steps of the method disclosed herein may also be used in determining a best bonus premium. As above, this bonus life insurance premium rate may be selected for each mortality data set 102 from the lowest vendor rate, as adjusted by the proportional rating for that vendor, for that mortality data set. In one non-limiting example, this rate table may be calculated as follows:

```
     CalcBNPremArray[type_, sex_, sns_, age_, num_] :=
If[ type == 1,
 (If[sex == 1,
   (If[ sns == 1,
    ({((bnms01[[age – 17]]*num*sdb)*(1 +
      bnpremadj1)), ((bnms02[[age – 17]]*num*sdb)*(1 +
      bnpremadj2)), ((bnms03[[age – 17]]*num*sdb)*(1 +
      bnpremadj3)), ((bnms04[[age – 17]]*num*sdb)*(1 +
      bnpremadj4)), ((bnms05[[age – 17]]*num*sdb)*(1 +
      bnpremadj5)), ((bnms06[[age – 17]]*num*sdb)*(1 + bnpremadj6))}),
    ({((bnmn01[[age – 17]]*num*sdb)*(1 +
      bnpremadj1)), ((bnmn02[[age – 17]]*num*sdb)*(1 +
      bnpremadj2)), ((bnmn03[[age – 17]]*num*sdb)*(1 +
      bnpremadj3)), ((bnmn04[[age – 17]]*num*sdb)*(1 +
      bnpremadj4)), ((bnmn05[[age – 17]]*num*sdb)*(1 +
      bnpremadj5)), ((bnmn06[[age – 17]]*num*sdb)*(1 +
      bnpremadj6))})]),
   (If[ sns == 1,
    ({((bnfs01[[age – 17]]*num*sdb)*(1 +
      bnpremadj1)), ((bnfs02[[age – 17]]*num*sdb)*(1 +
      bnpremadj2)), ((bnfs03[[age – 17]]*num*sdb)*(1 +
      bnpremadj3)), ((bnfs04[[age – 17]]*num*sdb)*(1 +
      bnpremadj4)), ((bnfs05[[age – 17]]*num*sdb)*(1 +
      bnpremadj5)), ((bnfs06[[age – 17]]*num*sdb)*(1 + bnpremadj6))}),
    ({((bnfn01[[age – 17]]*num*sdb)*(1 +
      bnpremadj1)), ((bnfn02[[age – 17]]*num*sdb)*(1 +
      bnpremadj2)), ((bnfn03[[age – 17]]*num*sdb)*(1 +
      bnpremadj3)), ((bnfn04[[age – 17]]*num*sdb)*(1 +
      bnpremadj4)), ((bnfn05[[age – 17]]*num*sdb)*(1 +
      bnpremadj5)), ((bnfn06[[age – 17]]*num*sdb)*(1 +
      bnpremadj6))})])
 ),
 (If[sex == 1,
   (If[sns == 1,
    ({((bnms01[[age – 17]]*num*bonus)*(1 +
      bnpremadj1)), ((bnms02[[age – 17]]*num*bonus)*(1 +
      bnpremadj2)), ((bnms03[[age – 17]]*num*bonus)*(1 +
      bnpremadj3)), ((bnms04[[age – 17]]*num*bonus)*(1 +
      bnpremadj4)), ((bnms05[[age – 17]]*num*bonus)*(1 +
      bnpremadj5)), ((bnms06[[age – 17]]*num*bonus)*(1 +
      bnpremadj6))}), ({((bnmn01[[age – 17]]*num*bonus)*(1 +
      bnpremadj1)), ((bnmn02[[age – 17]]*num*bonus)*(1 +
      bnpremadj2)), ((bnmn03[[age – 17]]*num*bonus)*(1 +
      bnpremadj3)), ((bnmn04[[age – 17]]*num*bonus)*(1 +
      bnpremadj4)), ((bnmn05[[age – 17]]*num*bonus)*(1 +
      bnpremadj5)), ((bnmn06[[age – 17]]*num*bonus)*(1 +
      bnpremadj6))})]),
   (If[sns == 1,
    ({((bnfs01[[age – 17]]*num*bonus)*(1 +
      bnpremadj1)), ((bnfs02[[age – 17]]*num*bonus)*(1 +
      bnpremadj2)), ((bnfs03[[age – 17]]*num*bonus)*(1 +
      bnpremadj3)), ((bnfs04[[age – 17]]*num*bonus)*(1 +
      bnpremadj4)), ((bnfs05[[age – 17]]*num*bonus)*(1 +
      bnpremadj5)), ((bnfs06[[age – 17]]*num*bonus)*(1 +
      bnpremadj6))}), ({((bnfn01[[age – 17]]*num*bonus)*(1 +
      bnpremadj1)), ((bnfn02[[age – 17]]*num*bonus)*(1 +
      bnpremadj2)), ((bnfn03[[age – 17]]*num*bonus)*(1 +
      bnpremadj3)), ((bnfn04[[age – 17]]*num*bonus)*(1 +
      bnpremadj4)), ((bnfn05[[age – 17]]*num*bonus)*(1 +
      bnpremadj5)), ((bnfn06[[age – 17]]*num*bonus)*(1 +
      bnpremadj6))})])
 )
];
``` type=regular or bonus
sex=male or female
sns=smoking or non smoking
age=age of population
num=number of people in population
sdb=death benefit
bonus=bonus coverage amount in thousands (e.g. 50=$50,000)
bnms01=bonus premium male smoking company 1
bnmn01=bonus premium male smoking company 1
bnfs01=bonus premium female smoking company 1
bnfn01=bonus premium female smoking company 1
bnms02=bonus premium male smoking company 2
bnmn02=bonus premium male smoking company 2
bnfs02=bonus premium female smoking company 2
bnfn02=bonus premium female smoking company 2
bnms03=bonus premium male smoking company 3
bnmn03=bonus premium male smoking company 3
bnfs03=bonus premium female smoking company 3
bnfn03=bonus premium female smoking company 3
bnms04=bonus premium male smoking company 4
bnmn04=bonus premium male smoking company 4
bnfs04=bonus premium female smoking company 4
bnfn04=bonus premium female smoking company 4
bnms05=bonus premium male smoking company 5
bnmn05=bonus premium male smoking company 5
bnfs05=bonus premium female smoking company 5
bnfn05=bonus premium female smoking company 5
bnms06=bonus premium male smoking company 6
bnmn06=bonus premium male smoking company 6
bnfs06=bonus premium female smoking company 6
bnfn06=bonus premium female smoking company 6
bnpremadj1=+/−adjustment to bonus premium dollar value for company 1
bnpremadj2=+/−adjustment to bonus premium dollar value for company 2
bnpremadj3=+/−adjustment to bonus premium dollar value for company 3
bnpremadj4=+/−adjustment to bonus premium dollar value for company 4
bnpremadj5=+/−adjustment to bonus premium dollar value for company 5
bnpremadj6=+/−adjustment to bonus premium dollar value for company 6

Figure 5:
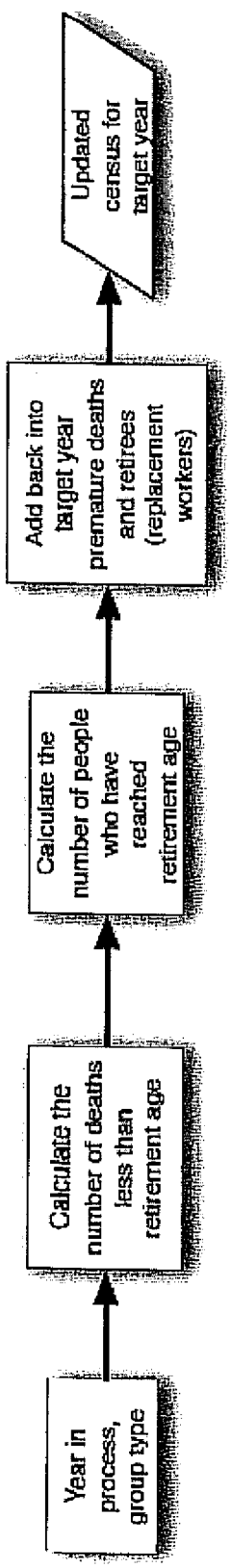
FIG. 5 is a diagrammatic view showing an embodiment of the "adding back" monitoring step of the method.

Referring now to FIGS. 1 and 5, once presented with a final rate table 112, a governmental entity or entity associated with the unfunded liability may then purchase the necessary level of insurance yielding a death benefit sufficient to meeting the requirements of the unfunded liability. Then, as a further step of the method 10, the result of the method may be further implemented and monitored on at least an annual basis by accounting for members of the population that have either (1) died prematurely; or (2) have retired. The method 10 (i.e., population models and benefit data) must, therefore, be adjusted to either account for this loss and/or my "adding back" into the data any new hires to the population that replaced the former members. In one non-limiting example, this adding back may be calculated as follows:

AddBack[yrs_, grouptype_]:=If[nh==True, (
If[grouptype==MN&&yrs==2, (targetyear1=MNYr2Pop; targetyear2=MNYr1Pop)];
If[grouptype==MN&&yrs==3, (targetyear1=MNYr3Pop; targetyear2=MNYr2Pop)];
If[grouptype==MN&&yrs==4, (targetyear1=MNYr4Pop; targetyear2=MNYr3Pop)];
If[grouptype==MN&&yrs==5, (targetyear1=MNYr5Pop; targetyear2=MNYr4Pop)];
If[grouptype==MN&&yrs==6, (targetyear1=MNYr6Pop; targetyear2=MNYr5Pop)];
If[grouptype==MN&&yrs==7, (targetyear1=MNYr7Pop; targetyear2=MNYr6Pop)];
If[grouptype==MN&&yrs==8, (targetyear1=MNYr8Pop; targetyear2=MNYr7Pop)];
If[grouptype==MN&&yrs==9, (targetyear1=MNYr9Pop; targetyear2=MNYr8Pop)];
If[grouptype==MN&&yrs==10, (targetyear1=MNYr10Pop; targetyear2=MNYr9Pop)];
If[grouptype==MN&&yrs==11, (targetyear1=MNYr11Pop; targetyear2=MNYr10Pop)];
If[grouptype==MN&&yrs==12, (targetyear1=MNYr12Pop; targetyear2=MNYr11Pop)];
If[grouptype==MN&&yrs==13, (targetyear1=MNYr13Pop; targetyear2=MNYr12Pop)];
If[grouptype==MN&&yrs==14, (targetyear1=MNYr14Pop; targetyear2=MNYr13Pop)];
If[grouptype==MN&&yrs==15, (targetyear1=MNYr15Pop; targetyear2=MNYr14Pop)];
If[grouptype==MN&&yrs==16, (targetyear1=MNYr16Pop; targetyear2=MNYr15Pop)];
If[grouptype==MN&&yrs==17, (targetyear1=MNYr17Pop; targetyear2=MNYr16Pop)];
If[grouptype==MN&&yrs==18, (targetyear1=MNYr18Pop; targetyear2=MNYr17Pop)];
If[grouptype==MN&&yrs==19, (targetyear1=MNYr19Pop; targetyear2=MNYr18Pop)];
If[grouptype==MN&&yrs==20, (targetyear1=MNYr20Pop; targetyear2=MNYr19Pop)];
If[grouptype==MN&&yrs==21, (targetyear1=MNYr21Pop; targetyear2=MNYr20Pop)];
If[grouptype==MN&&yrs==22, (targetyear1=MNYr22Pop; targetyear2=MNYr21Pop)];
If[grouptype==MN&&yrs==23, (targetyear1=MNYr23Pop; targetyear2=MNYr22Pop)];
If[grouptype==MN&&yrs==24, (targetyear1=MNYr24Pop; targetyear2=MNYr23Pop)];
If[grouptype==MN&&yrs==25, (targetyear1=MNYr25Pop; targetyear2=MNYr24Pop)];
If[grouptype==MN&&yrs==26, (targetyear1=MNYr26Pop; targetyear2=MNYr25Pop)];
If[grouptype==MN&&yrs==27, (targetyear1=MNYr27Pop; targetyear2=MNYr26Pop)];
If[grouptype==MN&&yrs==28, (targetyear1=MNYr28Pop; targetyear2=MNYr27Pop)];
If[grouptype==MN&&yrs==29, (targetyear1=MNYr29Pop; targetyear2=MNYr28Pop)];
If[grouptype==MN&&yrs==30, (targetyear1=MNYr300Pop; targetyear2=MNYr29Pop)];
If[grouptype==MN&&yrs==31, (targetyear1=MNYr31Pop; targetyear2=MNYr30Pop)];
If[grouptype==MN&&yrs==32, (targetyear1=MNYr32Pop; targetyear2=MNYr31Pop)];
If[grouptype==MN&&yrs==33, (targetyear1=MNYr33Pop; targetyear2=MNYr32Pop)];
If[grouptype==MN&&yrs==34, (targetyear1=MNYr34Pop; targetyear2=MNYr33Pop)];
If[grouptype==MN&&yrs==35, (targetyear1=MNYr35Pop; targetyear2=MNYr34Pop)];
If[grouptype==MN&&yrs==36, (targetyear1=MNYr36Pop; targetyear2=MNYr35Pop)];
If[grouptype==MN&&yrs==37, (targetyear1=MNYr37Pop; targetyear2=MNYr36Pop)];
If[grouptype==MN&&yrs==38, (targetyear1=MNYr38Pop; targetyear2=MNYr37Pop)];
If[grouptype==MN&&yrs==39, (targetyear1=MNYr39Pop; targetyear2=MNYr38Pop)];
If[grouptype==MN&&yrs==40, (targetyear1=MNYr40Pop; targetyear2=MNYr39Pop)];
If[grouptype==MN&&yrs==41, (targetyear1=MNYr41Pop; targetyear2=MNYr40Pop)];
If[grouptype==MN&&yrs==42, (targetyear1=MNYr42Pop; targetyear2=MNYr41Pop)];
If[grouptype==MN&&yrs==43, (targetyear1=MNYr43Pop; targetyear2=MNYr42Pop)];
If[grouptype==MS&&yrs==2, (targetyear1=MSYr2Pop; targetyear2=MSYr1Pop)];
If[grouptype==MS&&yrs==3, (targetyear1=MSYr3Pop; targetyear2=MSYr2Pop)];
If[grouptype==MS&&yrs==4, (targetyear1=MSYr4Pop; targetyear2=MSYr3Pop)];
If[grouptype==MS&&yrs==5, (targetyear1=MSYr5Pop; targetyear2=MSYr4Pop)];
If[grouptype==MS&&yrs==6, (targetyear1=MSYr6Pop; targetyear2=MSYr5Pop)];
If[grouptype==MS&&yrs==7, (targetyear1=MSYr7Pop; targetyear2=MSYr6Pop)];
If[grouptype==MS&&yrs==8, (targetyear1=MSYr8Pop; targetyear2=MSYr7Pop)];
If[grouptype==MS&&yrs==9, (targetyear1=MSYr9Pop; targetyear2=MSYr8Pop)];

If[grouptype==MS&&yrs==10,
  (targetyear1=MSYr10Pop; targetyear2=MSYr9Pop)];
If[grouptype==MS&&yrs==11,
  (targetyear1=MSYr11Pop; targetyear2=MSYr10Pop)];
If[grouptype==MS&&yrs==12,
  (targetyear1=MSYr12Pop; targetyear2=MSYr11Pop)];
If[grouptype==MS&&yrs==13,
  (targetyear1=MSYr13Pop; targetyear2=MSYr12Pop)];
If[grouptype==MS&&yrs==14,
  (targetyear1=MSYr14Pop; targetyear2=MSYr13Pop)];
If[grouptype==MS&&yrs==15,
  (targetyear1=MSYr15Pop; targetyear2=MSYr14Pop)];
If[grouptype==MS&&yrs==16,
  (targetyear1=MSYr16Pop; targetyear2=MSYr15Pop)];
If[grouptype==MS&&yrs==17,
  (targetyear1=MSYr17Pop; targetyear2=MSYr16Pop)];
If[grouptype==MS&&yrs==18,
  (targetyear1=MSYr18Pop; targetyear2=MSYr17Pop)];
If[grouptype==MS&&yrs==19,
  (targetyear1=MSYr19Pop; targetyear2=MSYr18Pop)];
If[grouptype==MS&&yrs==20,
  (targetyear1=MSYr20Pop; targetyear2=MSYr19Pop)];
If[grouptype==MS&&yrs==21,
  (targetyear1=MSYr21Pop;
  targetyear2=MSYr200Pop)];
If[grouptype==MS&&yrs==22,
  (targetyear1=MSYr22Pop; targetyear2=MSYr21Pop)];
If[grouptype==MS&&yrs==23,
  (targetyear1=MSYr23Pop; targetyear2=MSYr22Pop)];
If[grouptype==MS&&yrs==24,
  (targetyear1=MSYr24Pop; targetyear2=MSYr23Pop)];
If[grouptype==MS&&yrs==25,
  (targetyear1=MSYr25Pop; targetyear2=MSYr24Pop)];
If[grouptype==MS&&yrs==26,
  (targetyear1=MSYr26Pop; targetyear2=MSYr25Pop)];
If[grouptype==MS&&yrs==27,
  (targetyear1=MSYr27Pop; targetyear2=MSYr26Pop)];
If[grouptype==MS&&yrs==28,
  (targetyear1=MSYr28Pop; targetyear2=MSYr27Pop)];
If[grouptype==MS&&yrs==29,
  (targetyear1=MSYr29Pop; targetyear2=MSYr28Pop)];
If[grouptype==MS&&yrs==30,
  (targetyear1=MSYr30Pop; targetyear2=MSYr29Pop)];
If[grouptype==MS&&yrs==31,
  (targetyear1=MSYr31Pop; targetyear2=MSYr30Pop)];
If[grouptype==MS&&yrs==32,
  (targetyear1=MSYr32Pop; targetyear2=MSYr31Pop)];
If[grouptype==MS&&yrs==33,
  (targetyear1=MSYr33Pop; targetyear2=MSYr32Pop)];
If[grouptype==MS&&yrs==34,
  (targetyear1=MSYr34Pop; targetyear2=MSYr33Pop)];
If[grouptype==MS&&yrs==35,
  (targetyear1=MSYr35Pop; targetyear2=MSYr34Pop)];
If[grouptype==MS&&yrs==36,
  (targetyear1=MSYr36Pop; targetyear2=MSYr35Pop)];
If[grouptype==MS&&yrs==37,
  (targetyear1=MSYr37Pop; targetyear2=MSYr36Pop)];
If[grouptype==MS&&yrs==38,
  (targetyear1=MSYr38Pop; targetyear2=MSYr37Pop)];
If[grouptype==MS&&yrs==39,
  (targetyear1=MSYr39Pop; targetyear2=MSYr38Pop)];
If[grouptype==MS&&yrs==40,
  (targetyear1=MSYr40Pop; targetyear2=MSYr39Pop)];
If[grouptype==MS&&yrs==41,
  (targetyear1=MSYr41Pop; targetyear2=MSYr40Pop)];
If[grouptype==MS&&yrs==42,
  (targetyear1=MSYr42Pop; targetyear2=MSYr41Pop)];
If[grouptype==MS&&yrs==43,
  (targetyear1=MSYr43Pop; targetyear2=MSYr42Pop)];
If[grouptype==MS&&yrs==44,
  (targetyear1=MSYr44Pop; targetyear2=MSYr43Pop)];
If[grouptype==MS&&yrs==45,
  (targetyear1=MSYr45Pop; targetyear2=MSYr44Pop)];
If[grouptype==MS&&yrs==46,
  (targetyear1=MSYr46Pop; targetyear2=MSYr45Pop)];
If[grouptype==MS&&yrs==47,
  (targetyear1=MSYr47Pop; targetyear2=MSYr46Pop)];
If[grouptype==MS&&yrs==48,
  (targetyear1=MSYr.48Pop;
  targetyear2=MSYr47Pop)];
If[grouptype==MS&&yrs==49,
  (targetyear1=MSYr49Pop; targetyear2=MSYr48Pop)];
If[grouptype==MS&&yrs==50,
  (targetyear1=MSYr50Pop; targetyear2=MSYr49Pop)];
If[grouptype==MS&&yrs==51, (targetyear1=MSYr51
  Pop; targetyear2=MSYr50Pop)];
If[grouptype==FN&&yrs==2, (targetyear1=FNYr2Pop;
  targetyear2=FNYr1Pop)];
If[grouptype==FN&&yrs==3, (targetyear1=FNYr3Pop;
  targetyear2=FNYr2Pop)];
If[grouptype==FN&&yrs==4, (targetyear1=FNYr4Pop;
  targetyear2=FNYr3Pop)];
If[grouptype==FN&&yrs==5, (targetyear1=FNYr5Pop;
  targetyear2=FNYr4Pop)];
If[grouptype==FN&&yrs==6, (targetyear1=FNYr6Pop;
  targetyear2=FNYr5Pop)];
If[grouptype==FN&&yrs==7, (targetyear1=FNYr7Pop;
  targetyear2=FNYr6Pop)];
If[grouptype==EN&&yrs==8, (targetyear1=FNYr8Pop;
  targetyear2=FNYr7Pop)];
If[grouptype==FN&&yrs==9, (targetyear1=FNYr9Pop;
  targetyear2=FNYr8Pop)];
If[grouptype==FN&&yrs==10,
  (targetyear1=FNYr10Pop; targetyear2=FNYr9Pop)];
If[grouptype==FN&&yrs==11,
  (targetyear1=FNYr11Pop; targetyear2=FNYr10Pop)];
If[grouptype==FN&&yrs==12,
  (targetyear1=FNYr12Pop; targetyear2=FNYr11Pop)];
If[grouptype==FN&&yrs==13,
  (targetyear1=FNYr13Pop; targetyear2=FNYr12Pop)];
If[grouptype==FN&&yrs==14,
  (targetyear1=FNYr14Pop; targetyear2=FNYr13Pop)];
If[grouptype==FN&&yrs==15,
  (targetyear1=FNYr15Pop; targetyear2=FNYr14Pop)];
If[grouptype==FN&&yrs==16,
  (targetyear1=FNYr16Pop; targetyear2=FNYr15Pop)];
If[grouptype==FN&&yrs==17,
  (targetyear1=FNYr17Pop; targetyear2=FNYr16Pop)];
If[grouptype==FN&&yrs==18,
  (targetyear1=FNYr18Pop; targetyear2=FNYr17Pop)];
If[grouptype==FN&&yrs==19,
  (targetyear1=FNYr19Pop; targetyear2=FNYr18Pop)];
If[grouptype==FN&&yrs==20,
  (targetyear1=FNYr20Pop; targetyear2=FNYr19Pop)];
If[grouptype==FN&&yrs==21,
  (targetyear1=FNYr21Pop; targetyear2=FNYr20Pop)];
If[grouptype==FN&&yrs==22,
  (targetyear1=FNYr22Pop; targetyear2=FNYr21Pop)];
If[grouptype==FN&&yrs==23,
  (targetyear1=FNYr23Pop; targetyear2=FNYr22Pop)];
If[grouptype==FN&&yrs==24,
  (targetyear1=FNYr24Pop; targetyear2=FNYr23Pop)];
If[grouptype==FN&&yrs==25,
  (targetyear1=FNYr25Pop; targetyear2=FNYr24Pop)];

If[grouptype==FN&&yrs==26, (targetyear1=FNYr26Pop; targetyear2=FNYr25Pop)];
If[grouptype==FN&&yrs==27, (targetyear1=FNYr27Pop; targetyear2=FNYr26Pop)];
If[grouptype==FN&&yrs==28, (targetyear1=FNYr28Pop; targetyear2=FNYr27Pop)];
If[grouptype==FN&&yrs==29, (targetyear1=FNYr29Pop; targetyear2=FNYr28Pop)];
If[grouptype==FN&&yrs==30, (targetyear1=FNYr30Pop; targetyear2=FNYr29Pop)];
If[grouptype==FN&&yrs==31, (targetyear1=FNYr31Pop; targetyear2=FNYr30Pop)];
If[grouptype==FN&&yrs==32, (targetyear1=FNYr32Pop; targetyear2=FNYr31 Pop)];
If[grouptype==FN&&yrs==33, (targetyear1=FNYr33Pop; targetyear2=FNYr32Pop)];
If[grouptype==FN&&yrs==34, (targetyear1=FNYr34Pop; targetyear2=FNYr33Pop)];
If[grouptype==FN&&yrs==35, (targetyear1=FNYr35Pop; targetyear2=FNYr34Pop)];
If[grouptype==FN&&yrs==36, (targetyear1=FNYr36Pop; targetyear2=FNYr35Pop)];
If[grouptype==FN&&yrs==37, (targetyear1=FNYr37Pop; targetyear2=FNYr36Pop)];
If[grouptype==FN&&yrs==38, (targetyear1=FNYr38Pop; targetyear2=FNYr37Pop)];
If[grouptype==FN&&yrs==39, (targetyear1=FNYr39Pop; targetyear2=FNYr38Pop)];
If[grouptype==FN&&yrs==40, (targetyear1=FNYr40Pop; targetyear2=FNYr39Pop)];
If[grouptype==FN&&yrs==41, (targetyear1=FNYr41 Pop; targetyear2=FNYr40Pop)];
If[grouptype==FN&&yrs==42, (targetyear1=FNYr42Pop; targetyear2=FNYr41Pop)];
If[grouptype==FN&&yrs==43, (targetyear1=FNYr43Pop; targetyear2=FNYr42Pop)];
If[grouptype==FN&&yrs==44, (targetyear1=FNYr44Pop; targetyear2=FNYr43Pop)];
If[grouptype==FN&&yrs==45, (targetyear1=FNYr45Pop; targetyear2=FNYr44Pop)];
If[grouptype==FN&&yrs==46, (targetyear1=FNYr46Pop; targetyear2=FNYr45Pop)];
If[grouptype==FN&&yrs==47, (targetyear1=FNYr47Pop; targetyear2=FNYr46Pop)];
If[grouptype==FN&&yrs==48, (targetyear1=FNYr48Pop; targetyear2=FNYr47Pop)];
If[grouptype==FN&&yrs==49, (targetyear1=FNYr49Pop; targetyear2=FNYr48Pop)];
If[grouptype==FN&&yrs==50, (targetyear1=FNYr50Pop; targetyear2=FNYr49Pop)];
If[grouptype==FN&&yrs==51, (targetyear1=FNYr51 Pop; targetyear2=FNYr50Pop)];
If[grouptype==FS&&yrs==2, (targetyear1=FSYr2Pop; targetyear2=FSYr1Pop)];
If[grouptype==FS&&yrs==3, (targetyear1=FSYr3Pop; targetyear2=FSYr2Pop)];
If[grouptype==FS&&yrs==4, (targetyear1=FSYr4Pop; targetyear2=FSYr3Pop)];
If[grouptype==FS&&yrs==5, (targetyear1=FSYr5Pop; targetyear2=FSYr4Pop)];
If[grouptype==FS&&yrs==6, (targetyear1=FSYr6Pop; targetyear2=FSYr5Pop)];
If[grouptype==FS&&yrs==7, (targetyear1=FSYr7Pop; targetyear2=FSYr6Pop)];
If[grouptype==FS&&yrs==8, (targetyear1=FSYr8Pop; targetyear2=FSYr7Pop)];
If[grouptype==FS&&yrs==9, (targetyear1=FSYr9Pop; targetyear2=FSYr8Pop)];
If[grouptype==FS&&yrs==10, (targetyear1=FSYr10Pop; targetyear2=FSYr9Pop)];
If[grouptype==FS&&yrs==11, (targetyear1=FSYr11Pop; targetyear2=FSYr10Pop)];
If[grouptype==FS&&yrs==12, (targetyear1=FSYr12Pop; targetyear2=FSYr11Pop)];
If[grouptype==FS&&yrs==13, (targetyear1=FSYr13Pop; targetyear2=FSYr12Pop)];
If[grouptype==FS&&yrs==14, (targetyear1=FSYr14Pop; targetyear2=FSYr13Pop)];
If[grouptype==FS&&yrs==15, (targetyear1=FSYr15Pop; targetyear2=FSYr14Pop)];
If[grouptype==FS&&yrs==16, (targetyear1=FSYr16Pop; targetyear2=FSYr15Pop)];
If[grouptype==FS&&yrs==17, (targetyear1=FSYr17Pop; targetyear2=FSYr16Pop)];
If[grouptype==FS&&yrs==18, (targetyear1=FSYr18Pop; targetyear2=FSYr17Pop)];
If[grouptype==FS&&yrs==19, (targetyear1=FSYr19Pop; targetyear2=FSYr18Pop)];
If[grouptype==FS&&yrs==20, (targetyear1=FSYr20Pop; targetyear2=FSYr19Pop)];
If[grouptype==FS&&yrs==21, (targetyear1=FSYr21Pop; targetyear2=FSYr20Pop)];
If[grouptype==FS&&yrs==22, (targetyear1=FSYr22Pop; targetyear2=FSYr21Pop)];
If[grouptype==FS&&yrs==23, (targetyear1=FSYr23Pop; targetyear2=FSYr22Pop)];
If[grouptype==FS&&yrs==24, (targetyear1=FSYr24Pop; targetyear2=FSYr23Pop)];
If[grouptype==FS&&yrs==25, (targetyear1=FSYr25Pop; targetyear2=FSYr24Pop)];
If[grouptype==FS&&yrs==26, (targetyear1=FSYr26Pop; targetyear2=FSYr25Pop)];
If[grouptype==FS&&yrs==27, (targetyear1=FSYr27Pop; targetyear2=FSYr26Pop)];
If[grouptype==FS&&yrs==28, (targetyear1=FSYr28Pop; targetyear2=FSYr27Pop)];
If[grouptype==FS&&yrs==29, (targetyear1=FSYr29Pop; targetyear2=FSYr28Pop)];
If[grouptype==FS&&yrs==30, (targetyear1=FSYr30Pop; targetyear2=FSYr29Pop)];
If[grouptype==FS&&yrs==31, (targetyear1=FSYr31Pop; targetyear2=FSYr30Pop)];
If[grouptype==FS&&yrs==32, (targetyear1=FSYr32Pop; targetyear2=FSYr31Pop)];
If[grouptype==FS&&yrs==33, (targetyear1=FSYr33Pop; targetyear2=FSYr32Pop)];
If[grouptype==FS&&yrs==34, (targetyear1=FSYr34Pop; targetyear2=FSYr33Pop)];
If[grouptype==FS&&yrs==35, (targetyear1=FSYr35Pop; targetyear2=FSYr34Pop)];
If[grouptype==FS&&yrs==36, (targetyear1=FSYr36Pop; targetyear2=FSYr35Pop)];
If[grouptype==FS&&yrs==37, (targetyear1=FSYr37Pop; targetyear2=FSYr36Pop)];
If[grouptype==FS&&yrs==38, (targetyear1=FSYr38Pop; targetyear2=FSYr37Pop)];
If[grouptype==FS&&yrs==39, (targetyear1=FSYr39Pop; targetyear2=FSYr38Pop)];
If[grouptype==FS&&yrs==40, (targetyear1=FSYr40Pop; targetyear2=FSYr39Pop)];
If[grouptype==FS&&yrs==41, (targetyear1=FSYr411Pop; targetyear2=FSYr40Pop)];

If[grouptype==FS&&yrs==42, (targetyear1=FSYr42Pop; targetyear2=FSYr41Pop)];
If[grouptype==FS&&yrs==43, (targetyear1=FSYr43Pop; targetyear2=FSYr42Pop)];
If[grouptype==FS&&yrs==44, (targetyear1=FSYr44Pop; targetyear2=FSYr43Pop)];
If[grouptype==FS&&yrs==45, (targetyear1=FSYr45Pop; targetyear2=FSYr44Pop)];
If[grouptype==FS&&yrs==46, (targetyear1=FSYr46Pop; targetyear2=FSYr45Pop)];
If[grouptype==FS&&yrs==47, (targetyear1=FSYr47Pop; targetyear2=FSYr46Pop)];
If[grouptype==FS&&yrs==48, (targetyear1=FSYr48Pop; targetyear2=FSYr47Pop)];
If[grouptype==FS&&yrs==49, (targetyear1=FSYr49Pop; targetyear2=FSYr48Pop)];
If[grouptype==FS&&yrs==50, (targetyear1=FSYr50Pop; targetyear2=FSYr49Pop)];
If[grouptype==FS&&yrs==51, (targetyear1=FSYr51Pop; targetyear2=FSYr50Pop)];
targetyear1=
  RePlacePart[targetyear1,
    newhireage−17→
    targetyear1[[
      newhireage−17]]+(If[(Total[targetyear1, {1, retirementage−17}]−Total[targetyear2, {1, retirementage−17}])>0, Total[targetyear1, {1, retirementage−17}]−Total[targetyear2, {1, retirementage−17}], 0]+targetyear1[[retirementage−17]])];
If[grouptype==MN&&yrs==2, MNYr2Pop=targetyear1];
If[grouptype==MN&&yrs==3, MNYr3Pop=targetyear1];
If[grouptype==MN&&yrs==4, MNYr4Pop=targetyear1];
If[grouptype==MN&&yrs==5, MNYr5Pop=targetyear1];
If[grouptype==MN&&yrs==6, MNYr6Pop=targetyear1];
If[grouptype==MN&&yrs==7, MNYr7Pop=targetyear1];
If[grouptype==MN&&yrs==8, MNYr8Pop=targetyear1];
If[grouptype==MN&&yrs==9, MNYr9Pop=targetyear1];
If[grouptype==MN&&yrs==10, MNYr10Pop=targetyear1];
If[grouptype==MN&&yrs==11, MNYr11Pop=targetyear1];
If[grouptype==MN&&yrs==12, MNYr12Pop=targetyear1];
If[grouptype==MN&&yrs==13, MNYr13Pop=targetyear1];
If[grouptype==MN&&yrs==14, MNYr14Pop=targetyear1];
If[grouptype==MN&&yrs==15, MNYr15Pop=targetyear1];
If[grouptype==MN&&yrs==16, MNYr16Pop=targetyear1];
If[grouptype==MN&&yrs==17, MNYr17Pop=targetyear1];
If[grouptype==MN&&yrs==18, MNYr18Pop=targetyear1];
If[grouptype==MN&&yrs==19, MNYr19Pop=targetyear1];
If[grouptype==MN&&yrs==20, MNYr20Pop=targetyear1];
If[grouptype==MN&&yrs==21, MNYr21Pop=targetyear1];
If[grouptype==MN&&yrs==22, MNYr22Pop=targetyear1];
If[grouptype==MN&&yrs==23, MNYr23Pop=targetyear1];
If[grouptype==MN&&yrs==24, MNYr24Pop=targetyear1];
If[grouptype==MN&&yrs==25, MNYr25Pop=targetyear1];
If[grouptype==MN&&yrs==26, MNYr26Pop=targetyear1];
If[grouptype==MN&&yrs==27, MNYr27Pop=targetyear1];
If[grouptype==MN&&yrs==28, MNYr28Pop=targetyear1];
If[grouptype==MN&&yrs==29, MNYr29Pop=targetyear1];
If[grouptype==MN&&yrs==30, MNYr30Pop=targetyear1];
If[grouptype==MN&&yrs==31, MNYr31Pop=targetyear1];
If[grouptype==MN&&yrs==32, MNYr32Pop=targetyear1];
If[grouptype==MN&&yrs==33, MNYr33Pop=targetyear1];
If[grouptype==MN&&yrs==34, MNYr34Pop=targetyear1];
If[grouptype==MN&&yrs==35, MNYr35Pop=targetyear1];
If[grouptype==MN&&yrs==36, MNYr36Pop=targetyear1];
If[grouptype==MN&&yrs==37, MNYr37Pop=targetyear1];
If[grouptype==MN&&yrs==38, MNYr38Pop=targetyear1];
If[grouptype==MN&&yrs==39, MNYr39Pop=targetyear1];
If[grouptype==MN&&yrs==40, MNYr40Pop=targetyear1];
If[grouptype==MN&&yrs==41, MNYr41Pop=targetyear1];
If[grouptype==MN&&yrs==42, MNYr42Pop=targetyear1];
If[grouptype==MN&&yrs==43, MNYr43Pop=targetyear1];
If[grouptype==MN&&yrs==44, MNYr44Pop=targetyear1];
If[grouptype==MN&&yrs==45, MNYr45Pop=targetyear1];
If[grouptype==MN&&yrs==46, MNYr46Pop=targetyear1];
If[grouptype==MN&&yrs==47, MNYr47Pop=targetyear1];
If[grouptype==MN&&yrs==48, MNYr48Pop=targetyear1];
If[grouptype==MN&&yrs==49, MNYr49Pop=targetyear1];
If[grouptype==MN&&yrs==50, MNYr50Pop=targetyear1];
If[grouptype==MS&&yrs==2, MSYr2Pop=targetyear1];
If[grouptype==MS&&yrs==3, MSYr3Pop=targetyear1];
If[grouptype==MS&&yrs==4, MSYr4Pop=targetyear1];
If[grouptype==MS&&yrs==5, MSYr5Pop=targetyear1];
If[grouptype==MS&&yrs==6, MSYr6Pop=targetyear1];
If[grouptype==MS&&yrs==7, MSYr7Pop=targetyear1];
If[grouptype==MS&&yrs==8, MSYr8Pop=targetyear1];
If[grouptype==MS&&yrs==9, MSYr9Pop=targetyear1];
If[grouptype==MS&&yrs==10, MSYr10Pop=targetyear1];
If[grouptype==MS&&yrs==11, MSYr11Pop=targetyear1];

If[grouptype==MS&&yrs==12,
  MSYr12Pop=targetyear1];
If[grouptype==MS&&yrs==13,
  MSYr13Pop=targetyear1];
If[grouptype==MS&&yrs==14,
  MSYr14Pop=targetyear1];
If[grouptype==MS&&yrs==15,
  MSYr15Pop=targetyear1];
If[grouptype==MS&&yrs==16,
  MSYr16Pop=targetyear1];
If[grouptype==MS&&yrs==17,
  MSYr17Pop=targetyear1];
If[grouptype==MS&&yrs==18,
  MSYr18Pop=targetyear1];
If[grouptype==MS&&yrs==19,
  MSYr19Pop=targetyear1];
If[grouptype==MS&&yrs==20,
  MSYr20Pop=targetyear1];
If[grouptype==MS&&yrs==21,
  MSYr21Pop=targetyear1];
If[grouptype==MS&&yrs==22,
  MSYr22Pop=targetyear1];
If[grouptype==MS&&yrs==23,
  MSYr23Pop=targetyear1];
If[grouptype==MS&&yrs==24,
  MSYr24Pop=targetyear1];
If[grouptype==MS&&yrs==25,
  MSYr25Pop=targetyear1];
If[grouptype==MS&&yrs==26,
  MSYr26Pop=targetyear1];
If[grouptype==MS&&yrs==27,
  MSYr27Pop=targetyear1];
If[grouptype==MS&&yrs==28,
  MSYr28Pop=targetyear1];
If[grouptype==MS&&yrs==29,
  MSYr29Pop=targetyear1];
If[grouptype==MS&&yrs==30,
  MSYr30Pop=targetyear1];
If[grouptype==MS&&yrs==31,
  MSYr31Pop=targetyear1];
If[grouptype==MS&&yrs==32,
  MSYr32Pop=targetyear1];
If[grouptype==MS&&yrs==33,
  MSYr33Pop=targetyear1];
If[grouptype==MS&&yrs==34,
  MSYr34Pop=targetyear1];
If[grouptype==MS&&yrs==35,
  MSYr35Pop=targetyear1];
If[grouptype==MS&&yrs==36,
  MSYr36Pop=targetyear1];
If[grouptype==MS&&yrs==37,
  MSYr37Pop=targetyear1];
If[grouptype==MS&&yrs==38,
  MSYr38Pop=targetyear1];
If[grouptype==MS&&yrs==39,
  MSYr39Pop=targetyear1];
If[grouptype==MS&&yrs==40,
  MSYr40Pop=targetyear1];
If[grouptype==MS&&yrs==41,
  MSYr41Pop=targetyear1];
If[grouptype==MS&&yrs==42,
  MSYr42Pop=targetyear1];
If[grouptype==MS&&yrs==43,
  MSYr43Pop=targetyear1];
If[grouptype==MS&&yrs==44,
  MSYr44Pop=targetyear1];
If[grouptype==MS&&yrs==45,
  MSYr45Pop=targetyear1];
If[grouptype==MS&&yrs==46,
  MSYr46Pop=targetyear1];
If[grouptype==MS&&yrs==47,
  MSYr47Pop=targetyear1];
If[grouptype==MS&&yrs==48,
  MSYr48Pop=targetyear1];
If[grouptype==MS&&yrs==49,
  MSYr49Pop=targetyear1];
If[grouptype==MS&&yrs==50,
  MSYr50Pop=targetyear1];
If[grouptype==MS&&yrs==51, MSYr51
  Pop=targetyear1];
If[grouptype==FN&&yrs==2, FNYr2Pop=targetyear1];
If[grouptype==FN&&yrs==3, FNYr3Pop=targetyear1];
If[grouptype==FN&&yrs==4, FNYr4Pop=targetyear1];
If[grouptype==FN&&yrs==5, FNYr5Pop=targetyear1];
If[grouptype==FN&&yrs==6, FNYr6Pop=targetyear1;
If[grouptype==FN&&yrs==7, FNYr7Pop=targetyear1];
If[grouptype==FN&&yrs==8, FNYr8Pop=targetyear1];
If[grouptype==FN&&yrs==9, FNYr9Pop=targetyear1];
If[grouptype==FN&&yrs==10,
  FNYr10Pop=targetyear1];
If[grouptype==FN&&yrs==11,
  FNYr11Pop=targetyear1];
If[grouptype==FN&&yrs==12,
  FNYr12Pop=targetyear1];
If[grouptype==FN&&yrs==13,
  FNYr13Pop=targetyear1];
If[grouptype==FN&&yrs==14,
  FNYr14Pop=targetyear1];
If[grouptype==FN&&yrs==15,
  FNYr15Pop=targetyear1];
If[grouptype==FN&&yrs==16,
  FNYr16Pop=targetyear1];
If[grouptype==FN&&yrs==17,
  FNYr17Pop=targetyear1];
If[grouptype==FN&&yrs==18,
  FNYr18Pop=targetyear1];
If[grouptype==FN&&yrs==19,
  FNYr19Pop=targetyear1];
If[grouptype==FN&&yrs==20,
  FNYr20Pop=targetyear1];
If[grouptype==FN&&yrs==21,
  FNYr21Pop=targetyear1];
If[grouptype==FN&&yrs==22,
  FNYr22Pop=targetyear1];
If[grouptype==FN&&yrs==23,
  FNYr23Pop=targetyear1];
If[grouptype==FN&&yrs==24,
  FNYr24Pop=targetyear1];
If[grouptype==FN&&yrs==25,
  FNYr25Pop=targetyear1];
If[grouptype==FN&&yrs==26,
  FNYr26Pop=targetyear1];
If[grouptype==FN&&yrs==27,
  FNYr27Pop=targetyear1];
If[grouptype==FN&&yrs==28,
  FNYr28Pop=targetyear1];
If[grouptype==FN&&yrs==29,
  FNYr29Pop=targetyear1];
If[grouptype==FN&&yrs==30,
  FNYr30Pop=targetyear1];
If[grouptype==FN&&yrs==31,
  FNYr31Pop=targetyear1];

```
If[grouptype==FN&&yrs==32,
    FNYr32Pop=targetyear1];
If[grouptype==FN&&yrs==33,
    FNYr33Pop=targetyear1];
If[grouptype==FN&&yrs==34,
    FNYr34Pop=targetyear1];
If[grouptype==FN&&yrs==35,
    FNYr35Pop=targetyear1];
If[grouptype==FN&&yrs==36,
    FNYr36Pop=targetyear1];
If[grouptype==FN&&yrs==37,
    FNYr37Pop=targetyear1];
If[grouptype==FN&&yrs==38,
    FNYr38Pop=targetyear1];
If[grouptype==FN&&yrs==39,
    FNYr39Pop=targetyear1];
If[grouptype==FN&&yrs==40,
    FNYr400Pop=targetyear1];
If[grouptype==FN&&yrs==41,
    FNYr41Pop=targetyear1];
If[grouptype==FN&&yrs==42,
    FNYr42Pop=targetyear1];
If[grouptype==FN&&yrs==43,
    FNYr43Pop=targetyear1];
If[grouptype==FN&&yrs==44,
    FNYr44Pop=targetyear1];
If[grouptype==FN&&yrs==45,
    FNYr45Pop=targetyear1];
If[grouptype==FN&&yrs==46,
    FNYr46Pop=targetyear1];
If[grouptype==FN&&yrs==47,
    FNYr47Pop=targetyear1];
If[grouptype==FN&&yrs==48,
    FNYr48Pop=targetyear1];
If[grouptype==FN&&yrs==49,
    FNYr49Pop=targetyear1];
If[grouptype==FN&&yrs==50,
    FNYr500Pop=targetyear1];
If[grouptype==FN&&yrs==51,
    FNYr51Pop=targetyear1];
If[grouptype==FS&&yrs==2, FSYr2Pop=targetyear1];
If[grouptype==FS&&yrs==3, FSYr3Pop=targetyear1];
If[grouptype==FS&&yrs==4, FSYr4Pop=targetyear1];
If[grouptype==FS&&yrs==5, FSYr5Pop=targetyear1];
If[grouptype==FS&&yrs==6, FSYr6Pop=targetyear1];
If[grouptype==FS&&yrs==7, FSYr7Pop=targetyear1];
If[grouptype==FS&&yrs==8, FSYr8Pop=targetyear1];
If[grouptype==FS&&yrs==9, FSYr9Pop=targetyear1];
If[grouptype==FS&&yrs==10, FSYr10Pop=targetyear1];
If[grouptype==FS&&yrs==11, FSYr11Pop=targetyear1];
If[grouptype==FS&&yrs==12, FSYr12Pop=targetyear1];
If[grouptype==FS&&yrs==13, FSYr13Pop=targetyear1];
If[grouptype==FS&&yrs==14, FSYr14Pop=targetyear1];
If[grouptype==FS&&yrs==15, FSYr15Pop=targetyear1];
If[grouptype==FS&&yrs==16, FSYr16Pop=targetyear1];
If[grouptype==FS&&yrs==17, FSYr17Pop=targetyear1];
If[grouptype==FS&&yrs==18, FSYr18Pop=targetyear1];
If[grouptype==FS&&yrs==19, FSYr19Pop=targetyear1];
If[grouptype==FS&&yrs==20,
    FSYr200Pop=targetyear1];
If[grouptype==FS&&yrs==21, FSYr21Pop=targetyear1];
If[grouptype==FS&&yrs==22, FSYr22Pop=targetyear1];
If[grouptype==FS&&yrs==23, FSYr23Pop=targetyear1];
If[grouptype==FS&&yrs==24, FSYr24Pop=targetyear1];
If[grouptype==FS&&yrs==25, FSYr25Pop=targetyear1];
If[grouptype==FS&&yrs==26, FSYr26Pop=targetyear1];
If[grouptype==FS&&yrs==27, FSYr27Pop=targetyear1];
If[grouptype==FS&&yrs==28, FSYr28Pop=targetyear1];
If[grouptype==FS&&yrs==29, FSYr29Pop=targetyear1];
If[grouptype==FS&&yrs==30, FSYr30Pop=targetyear1];
If[grouptype==FS&&yrs==31, FSYr31Pop=targetyear1];
If[grouptype==FS&&yrs==32, FSYr32Pop=targetyear1];
If[grouptype==FS&&yrs==33, FSYr33Pop=targetyear1];
If[grouptype==FS&&yrs==34, FSYr34Pop=targetyear1];
If[grouptype==FS&&yrs==35, FSYr35Pop=targetyear1];
If[grouptype==FS&&yrs==36, FSYr36Pop=targetyear1];
If[grouptype==FS&&yrs==37, FSYr37Pop=targetyear1];
If[grouptype==FS&&yrs==38, FSYr38Pop=targetyear1];
If[grouptype==FS&&yrs==39, FSYr39Pop=targetyear1];
If[grouptype==FS&&yrs==40, FSYr40Pop=targetyear1];
If[grouptype==FS&&yrs==41, FSYr41Pop=targetyear1];
If[grouptype==FS&&yrs==42, FSYr42Pop=targetyear1];
If[grouptype==FS&&yrs==43, FSYr43Pop=targetyear1];
If[grouptype==FS&&yrs==44, FSYr44Pop=targetyear1];
If[grouptype==FS&&yrs==45, FSYr45Pop=targetyear1];
If[grouptype==FS&&yrs==46, FSYr46Pop=targetyear1];
If[grouptype==FS&&yrs==47, FSYr47Pop=targetyear1];
If[grouptype==FS&&yrs==48, FSYr48Pop=targetyear1];
If[grouptype==FS&&yrs==49, FSYr49Pop=targetyear1];
If[grouptype==FS&&yrs==50, FSYr50Pop=targetyear1];
If[grouptype==FS&&yrs==51,
    FSYr51Pop=targetyear1];)];
    yrs=years in program (e.g. 30)
    grouptype=MN, MS, FN, FS (male, female, smoking,
        non smoking)
    nh=add back new hires to census population
```

Having thus described my invention, various other embodiments will become apparent to those of skill in the art that do not depart from the scope of the disclosure or the claims.

The invention claimed is:

1. A method comprising:
   providing, a server operable to receive and transmit electronic data, the server including a processor module and a computer readable electronic storage module;
   receiving, by the server, a population data set including demographic data for each member of a predetermined population;
   generating, by the server a plurality of mortality data sets, each mortality data set being defined by a group of members of the population data set having a common set of demographic data and each mortality data set including a mortality rate for that defined group of members;
   generating, by the server, a financial target data set including the population data set and indicating, for each mortality data set, a per member average required life insurance benefit;
   transmitting, by the server the financial target data set to a plurality of life insurance vendors;
   receiving, by the server, from each of at least two life insurance vendors a rate table including the vendor's per member life insurance premium rate for each mortality data set;
   generating, by the server, a proportional rating for each insurance vendor; and
   generating, by the server, a final rate table having a per member life insurance premium rate for each mortality data set, the life insurance premium rate selected for each mortality data set being the lowest vendor rate, as adjusted by the proportional rating for that vendor, for that mortality data set.

2. The method of claim 1, wherein the mortality rate for each mortality data set is determined by selecting a mortality rate for each member of the data set from one of a plurality of mortality tables.

3. The method of claim 2, wherein the plurality of mortality tables are selected from a group consisting of the 1980 CSO, the 1994 GAR, the PK-2000 and the 2001 CSO.

4. The method of claim 1 wherein the mortality rate for each mortality data set is determined by selecting a mortality rate for each member of the data set from one of a plurality of mortality tables, with the mortality rate for each of at least two members of the data set being selected from two different mortality tables.

5. The method of claim 4, wherein the plurality of mortality tables are selected from a group consisting of the 1980 CSO, the 1994 GAR, the PK-2000 and the 2001 CSO.

6. The method of claim 1, wherein the demographic data set is selected from a group consisting of age data, gender data, smoking data, population group member health status data, employment compensation status data, employment responsibility level status data, type of employment, area of employment and physical location data.

7. The method of claim 1, wherein the common set of demographic data comprises age data, gender data and smoking data.

8. The method of claim 1, wherein the common set of demographic data consists of age data, gender data and smoking data.

9. The method of claim 1, wherein the plurality of mortality data sets comprise:
 (a) male, smokers between the ages of 18 and i20;
 (b) male, nonsmokers between the ages of 18 and 120;
 (c) female, smokers between the ages of 18 and 120;
 (d) female, nonsmokers between the ages of 18 and 120; and with each ages for (a) through (d) each comprising a separate data set for a total of 412 mortality data sets.

10. A method for financing unfunded liabilities comprising:
 providing a computer having a processor and a computer readable electronic storage module, the processor being in communication with a software component that is stored on the computer readable electronic storage module and into which is input information relating to a population data set including demographic data for each member of a predetermined population, the software component and the processor cooperating to issue at least one command further including:
 generating, by the computer, a plurality of mortality data sets, each mortality data set being defined by a group of members of the population data set having a common set of demographic data and each mortality data set including a mortality rate for that defined group of members;
 generating a financial target data set including the population data set and indicating, for each mortality data set, a per member average required life insurance benefit;
 transmitting, by the computer, the financial target data set to a plurality of remote life insurance vendor servers;
 receiving, by the computer, from each life insurance vendor server a rate table including the vendor's per member life insurance premium rate for each mortality data set;
 generating, by the computer, a proportional rating for each insurance vendor; and
 generating a final rate table having a per member life insurance premium rate for each mortality data set, the life insurance premium rate selected for each mortality data set being the lowest vendor rate, as adjusted by the proportional rating for that vendor, for that mortality data set.

* * * * *